(12) United States Patent
Kim et al.

(10) Patent No.: US 11,926,041 B2
(45) Date of Patent: Mar. 12, 2024

(54) THREE-DIMENSIONAL ELECTROMECHANICAL ADHESIVE SURFACE STRUCTURE CAPABLE OF ADHESIVE FORCE MANIPULATION AND TACTILE SENSING, DESIGN AND MANUFACTURING METHOD THEREOF USING 3D PRINTING

(71) Applicant: KOREA ADVANCED INSTITUTE OF SCIENCE AND TECHNOLOGY, Daejeon (KR)

(72) Inventors: Sanha Kim, Daejeon (KR); Donggeun Kim, Daejeon (KR); Hyeongmin Je, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 840 days.

(21) Appl. No.: 17/031,888

(22) Filed: Sep. 24, 2020

(65) Prior Publication Data
US 2021/0122064 A1  Apr. 29, 2021

(30) Foreign Application Priority Data
Oct. 29, 2019 (KR) .......................... 10-2019-0135715
Mar. 20, 2020 (KR) .......................... 10-2020-0034377

(51) Int. Cl.
*B25J 15/00* (2006.01)
*B25J 13/08* (2006.01)
(Continued)

(52) U.S. Cl.
CPC ......... *B25J 15/0085* (2013.01); *B25J 13/084* (2013.01); *B33Y 80/00* (2014.12); *G01L 1/146* (2013.01); *B33Y 10/00* (2014.12)

(58) Field of Classification Search
CPC ..... B25J 15/0085; B25J 13/084; B33Y 80/00; B33Y 10/00; G01L 1/146
See application file for complete search history.

(56) References Cited

U.S. PATENT DOCUMENTS 7,944,008 B2 * 5/2011 Parks ...................... G01L 1/146
257/419
2019/0240845 A1  8/2019 Hart et al.

FOREIGN PATENT DOCUMENTS

JP  H02119513 A  5/1990
KR  10-1486217 B  2/2015
(Continued)

*Primary Examiner* — Stephen A Vu
(74) *Attorney, Agent, or Firm* — INVENSTONE PATENT, LLC

(57) ABSTRACT

Disclosed are a design and manufacturing method for a three-dimensional electromechanical adhesive surface structure capable of adhesive force manipulation and tactile sensing by using 3D printing. The three-dimensional electromechanical adhesive surface structure includes: a body; a plurality of three-dimensional micro pillar structures which are attached to the body at a certain angle; and a wire which supplies voltage to the plurality of three-dimensional micro pillar structures. The three-dimensional micro pillar structure includes: a pillar which is attached to the body at a certain angle and is formed integrally with the body; a conductive material which is applied to surround the pillar; and an insulating material coated to surround the conductive material in order to be insulated from an opposite surface. The voltage supplied through the wire is supplied to the conductive material. A passage for providing the wire is formed under the plurality of three-dimensional micro pillar structures of the body. As a result, a technology allowing a robot to recognize, feel, and move an object beyond the human level is implemented, so that it is possible to maximize the convenience and efficiency.

12 Claims, 27 Drawing Sheets

(51) Int. Cl.
*B33Y 80/00* (2015.01)
*G01L 1/14* (2006.01)
*B33Y 10/00* (2015.01)

(56) References Cited

FOREIGN PATENT DOCUMENTS

KR 10-1510801 B 4/2015
WO WO-2008070201 A2 * 6/2008 ............. H02N 13/00

* cited by examiner (a)　　　　　　　　　(b)

(a)

(b)

(a)

(b)

THREE-DIMENSIONAL ELECTROMECHANICAL ADHESIVE SURFACE STRUCTURE CAPABLE OF ADHESIVE FORCE MANIPULATION AND TACTILE SENSING, DESIGN AND MANUFACTURING METHOD THEREOF USING 3D PRINTING

CROSS REFERENCES TO RELATED APPLICATION

The present application claims priority to Korean Patent Applications No. 10-2019-0135715 and 10-2020-0034377, filed Oct. 29, 2019 and Mar. 20, 2020, respectively, the entire contents of which is incorporated herein for all purposes by these references.

BACKGROUND

A dry adhesive technology which has been actively developed based on the imitation of the nano-cilia structure of lizard sole since the early 2000s is being successfully applied by Stanford University researchers in 2014 to an adhesive pad which enables a man to directly climbs a glass wall, to a gripper which lifts various objects, etc.

In addition to this, since the late 2000s, an electronic adhesive technology that induces an electrostatic force on a contact surface and manipulates the adhesive force has been applied to implement, likewise, a robot which climbs the wall, a gripper capable of lifting or conveying objects, etc.

Although current gripping robots are able to skillfully grip an object, they may fail in gripping the object because of the change of an environment, for example, the change of the material of the object to be gripped or slight change in the position of the object to be gripped, etc. This is because the gripping robot mainly performs "blind grasping" without sufficient recognition of the object.

In contrast with this, when a man grips an object, he/she can grip the object efficiently in accordance with situations by detecting correctly the position of the object by using a visual sense and by recognizing the material, weight, etc., of the object by the tactile sense of his/her hand. Particularly, as long as the material, weight, etc., of the object can be recognized by the tactile sensing, the direction and magnitude of the gripping force can be appropriately controlled, so that smart gripping with a sense of feeling is possible.

The existing dry adhesive technologies implemented with various materials and forms are able to reversibly manipulate the adhesive force by using three-dimensional micro pillar structures. However, they have a difficult manipulation method and have no tactile sensing function. An existing electronic adhesive technology has easier manipulation methods than those of the dry adhesive technology, but has a small maximum adhesive force.

An attempt has been made to fuse the electronic adhesive technology and the dry adhesive technology. However, this was just research focused on the improvement of the maximum adhesive force through simple series connection and was not implementation of a new principle of adhesion through the complicated micro structure manufacture and the tactile sensing function was not combined either.

SUMMARY

Various embodiments of the present disclosure relate to a three-dimensional electromechanical adhesive surface structure capable of adhesive force manipulation and tactile sensing, a manufacturing method thereof using 3D printing, and a device with the corresponding adhesive surface structure.

In order to overcome the above-described problems and to implement smart gripping with a sense of feeling without doing damage to objects to be gripped, tactile intelligence may be required to be combined.

Various embodiments of the present disclosure provide a contact surface of an electromechanical device, which is capable of tactile sensing for smart gripping with a sense of feeling.

Various embodiments of the present disclosure provide a three-dimensional micro adhesive surface structure which is newly designed and manufactured.

Various embodiments of the present disclosure provide the surface structure which is capable of not only reversible adhesive force manipulation by fusing a principle of electronic adhesion and a principle of mechanical adhesion but also tactile sensing that recognizes a local position, magnitude, and direction of a force applied to the surface of an object when contacting with and gripping the object.

Various embodiments of the present disclosure provide the surface structure which utilizes the advantages of the electronic adhesive technology and the dry adhesive technology, overcomes the limitation of each of the technologies, and is provided with the tactile sensing function.

Various embodiments of the present disclosure provide electronic machines, robots, or devices to which the surface structure capable of tactile sensing is adopted.

The technical problem to be overcome in the present disclosure is not limited to the above-mentioned technical problems. Other technical problems not mentioned can be clearly understood from those described below by a person having ordinary skill in the art.

One embodiment is a surface structure including: a body; a plurality of three-dimensional micro pillar structures which are attached to the body at a certain angle; and a wire which supplies a voltage to the plurality of three-dimensional micro pillar structures. The three-dimensional micro pillar structure includes: a pillar which is attached to the body at a certain angle and is formed integrally with the body; a conductive material which is applied to surround the pillar, and an insulating material coated to surround the conductive material in order to be insulated from an opposite surface. The voltage supplied through the wire is supplied to the conductive material. A passage for providing the wire is formed under of the plurality of three-dimensional micro pillar structures of the body.

Another embodiment is a gripper device including: a hinge; a support which is connected to both sides with respect to the hinge; a spring which controls bending of the support; and the above-described surface structure which is attached to the support.

Further another embodiment is a surface structure manufacturing method including: integrally manufacturing by stacking a body and a pillar which is a portion of a plurality of three-dimensional micro pillar structures formed at a certain angle with the body, such that a passage for providing wires is formed under the plurality of three-dimensional micro pillar structures of the body; connecting the wires through the passage; applying a conductive material to the pillar of the plurality of three-dimensional micro pillar structures; and coating the insulating material on the conductive material.

A tactile sensor receives the most attention among sensors for a robot. The tactile sensor proposed in various embodiments can provide new innovations both to a service robot market and to an industrial robot market in the future.

According to various embodiments, a technology allowing a robot to recognize, feel, and move an object beyond the human level is implemented, so that it is possible to maximize the convenience and efficiency.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF THE DRAWINGS

With regard to the description of the drawings, the same or similar reference numerals may be used for the same or similar components.

DETAILED DESCRIPTION OF EMBODIMENTS

Figure 1:
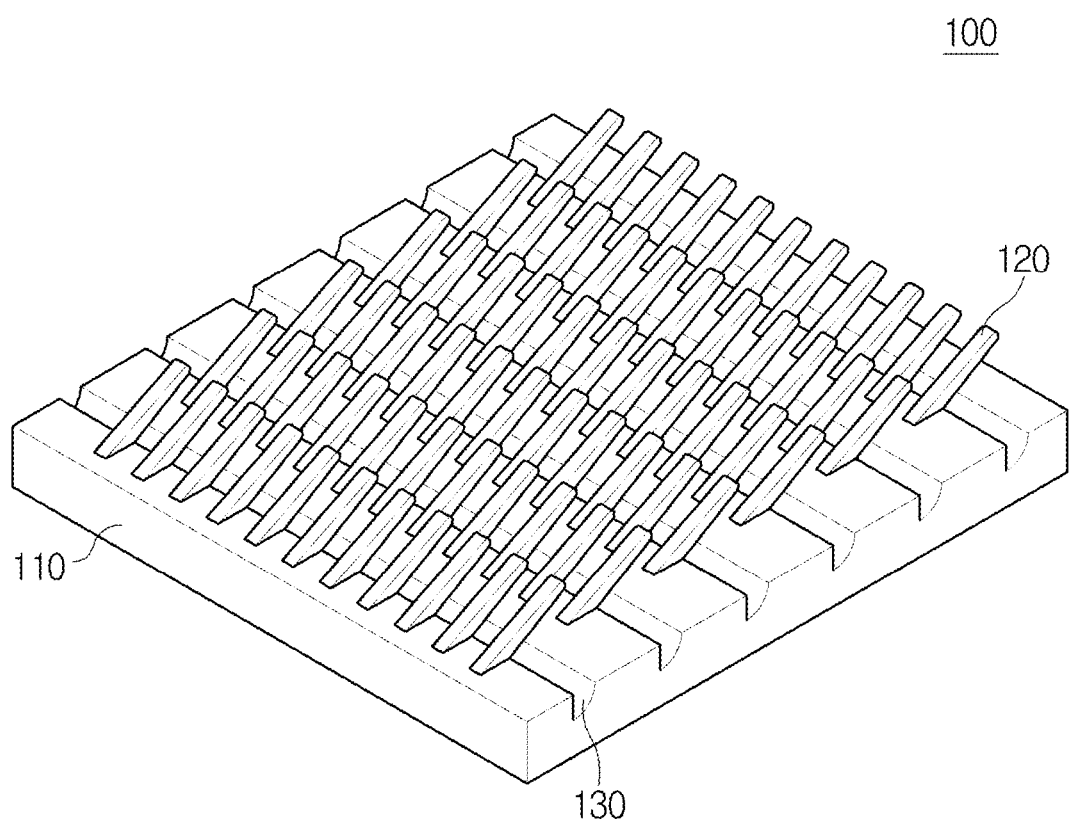
FIGS. 1 and 2 are views showing an example of an electromechanical micro adhesive surface structure 100 proposed by the present disclosure.

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

A suffix "module" or "part" for the component, which is used in the following description, is given or mixed in consideration of only convenience for ease of specification, and does not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Also, in the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Unlike gripping robots or a tongs-type gripper which lifts similarly to human fingers an object by holding the object or by using a friction force caused by a gripping force, a method of reversibly manipulating an adhesive force does not need to transfer a great force to the object because the object is gripped by manipulating an electrostatic force or an attractive force (Van der Waals force) which acts on the surface. Therefore, it is easy to combine with a soft and flexible substrate and the object is not damaged when being gripped.

The present disclosure intends to propose an adhesive surface structure with a new principle in which it utilizes advantages of the electronic adhesive technology and the dry adhesive technology through use of the above-mentioned advantages, overcomes the limitation of each of the technologies, and is additionally provided with a tactile sensing function.

Figure 2:
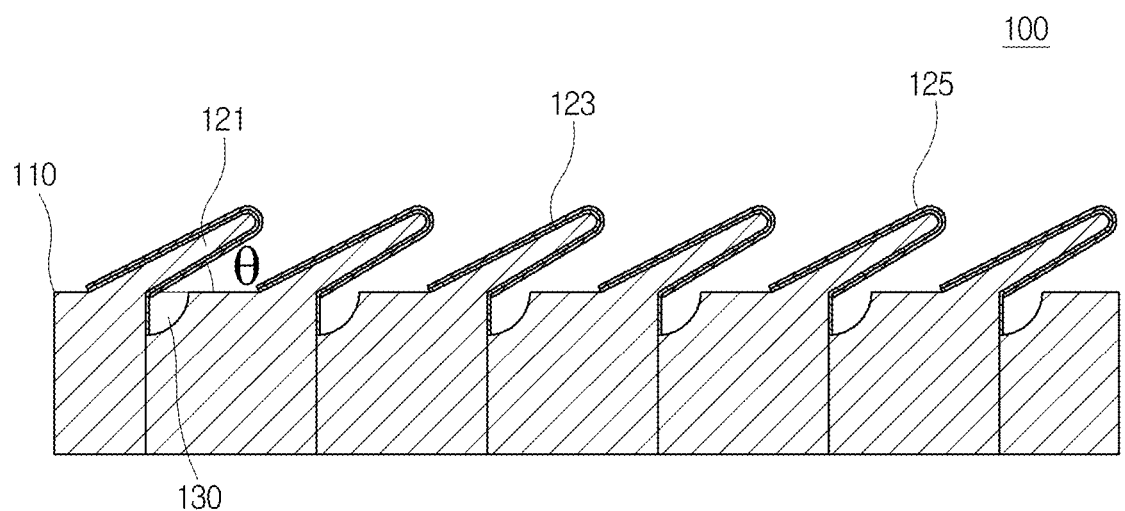

FIGS. 1 and 2 are views showing an example of an electromechanical micro adhesive surface structure 100 proposed by the present disclosure.

Referring to FIG. 1, the electromechanical micro adhesive surface structure 100 proposed by the present disclosure may be a three-dimensional micro structure which can be controlled in such a way as to electromechanically adhere to the surface of the object having various shapes and weights. As shown in FIG. 1, the electromechanical micro adhesive surface structure 100 proposed by the present disclosure may include a plurality of pillar structures 120 provided to a body 110 at a certain angle. The plurality of pillar structures 120 may be arranged on the body in rows and columns.

Referring to FIG. 2, the plurality of pillar structures 120 provided to the body 110 at a certain angle θ may include a linearly structured pillar 121 which may be integrally formed with the body 110, a conductive material 123 which is applied to surround the pillar 121, and an insulating material 125 which is coated in the form of a thin film to surround the conductive material 123.

According to the embodiment, the linearly structured pillar 121 may have a width of 1.5 mm and a length of 7 mm and may be provided to the body 110 at an angle of 15 to 75 degrees. Preferably, the linearly structured pillar 121 may be provided to the body 110 at an angle of 15, 40, 45, 60 or 75 degrees.

According to the embodiment, the conductive material 123 applied to surround the pillar 121 may be a silver nanowire. A first power supply (e.g., +1 kV) or a second power supply (e.g., −1 kV or 0 V) may be applied to the conductive material 123. The same first power supply or the same second power supply may be applied to the conductive material 123 of the pillar structure 120 located in the same column in the body 110. Also, the first power supply and the second power supply may be alternately applied according to the column where the conductive material is located in the body 110. For example, the first power supply may be applied to the conductive material 123 located in the odd column (first column, third column, . . . ) of the body 110, and the second power supply may be applied to the conductive material 123 located in the even column (second column, fourth column, . . . ) of the body 110.

The body 110 and the pillar 121 may be implemented at a time by using a 3D printer. When the 3D printer outputs, a passage 130 having a certain size may be formed along the column under the pillar structure 120 of the body 110 in order to prevent the pillar 121 from sticking to the body 110. This passage 130 may also allow wires which is required to apply voltage to the conductive material 123 to pass therethrough. According to the embodiment, the passage 130 having a certain size may have a quadrant shape.

Figure 3:
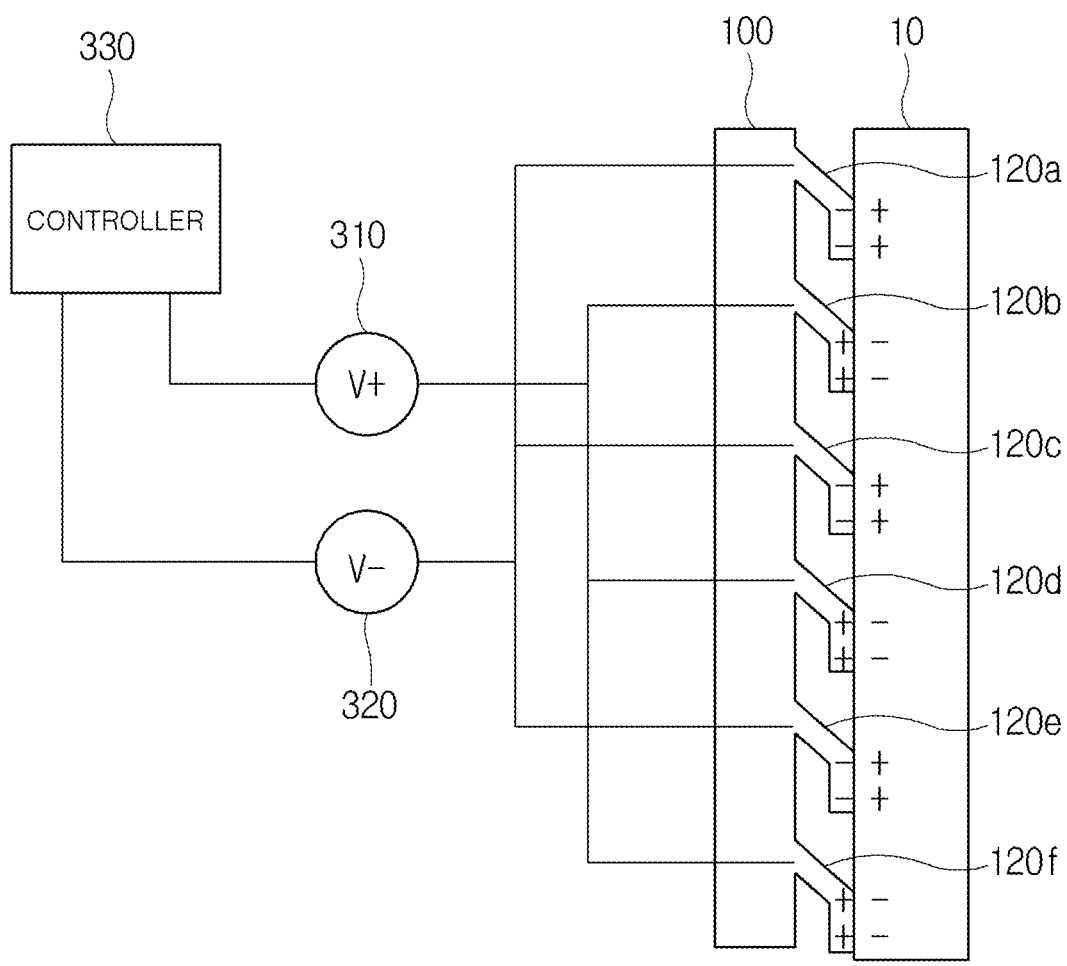
FIG. 3 is a view showing a principle in which the electromechanical micro adhesive surface structure according to the embodiment of the present disclosure adheres electromechanically to the surface of an object.

FIG. 3 is a view showing a principle in which the electromechanical micro adhesive surface structure 100 according to the embodiment of the present disclosure adheres electromechanically to the surface of an object 10.

Referring to FIG. 3, a voltage source 310 and a voltage source 320 may apply alternately a positive (+) voltage and a negative (−) voltage to the conductive material 123 of the pillar structure 120 in each column, which protrudes from the body 110 of the surface structure 100 according to the embodiment of the present disclosure. For example, a negative (−) voltage may be applied by the voltage source 320 to the pillar structure 120a in the first column, to the pillar structure 120c in the third column, and to the pillar structure 120e in the fifth column, and a positive (+) voltage may be applied by the voltage source 310 to the pillar structure 120b in the second column, to the pillar structure 120d in the fourth column, and to the pillar structure 120f in the sixth column.

In FIG. 3, a controller 330 may control the voltage source 310 and the voltage source 320 to control the magnitude of the voltage applied to the conductive material 123. According to the embodiment, the voltage source 310, the voltage source 320, and the controller 330 shown in FIG. 3 may be configured as a single device together with the surface structure 100. According to another embodiment, some or all of the voltage source 310, the voltage source 320, and the controller 330 may be located far away from the surface structure 100 and configured as separate devices.

Although not shown in FIG. 3, another voltage source (not shown) may be applied to additionally provide an alternating current (AC) voltage to the conductive material 123. Based on the applied AC voltage, it is possible to measure a capacitance or a change in the capacitance between the conductive materials 123 located in adjacent columns. Further, based on this, the contact with the object 10 can be recognized.

As shown in FIG. 3, when an external force is applied, the object 10 and the surface structure 100 may be in close contact with each other. When being in close contact in this way, the pillar structure 120 of the surface structure 100 may be bent due to mechanical deformation. Accordingly, a contact area between the surface structure 100 and the object 10 may be increased, and mechanical friction may be increased.

Also, the insulating material 125 is applied to the surface of the conductive material 123 within the pillar structure 120 of the surface structure 100, so that an electric charge cannot move freely between the surface of the object 10 and the conductive material 123 to which the voltage has been applied. However, as a positive electric charge by the positive (+) voltage and a negative electric charge by the negative (−) voltage are induced in the adjacent conductive material 123, an electric field is formed between the adjacent conductive materials 123. The formed electric field induces the charge having opposite polarity to be accumulated along the surface of the object 10. The electric charges having different polarities induced in the surface of the object 10 and the conductive material 123 may generate an electrostatic force attracting each other. The mechanical deformation of the pillar structure 120 of the surface structure 100 may be further increased as the surface structure 100 and the object 10 are in closer contact with each other by the electrostatic force as well as the force exerted from the outside. Accordingly, the contact area between the pillar structure 120 of the surface structure and the object 10 is further increased and mechanical friction is increased, so that the surface structure 100 can grip the object 10.

In the electromechanical surface structure proposed by the present disclosure, the mechanical adhesive force to the object 10 to be gripped can be increased by the electrostatic attraction generated by the applied voltage and additionally by the increase in the contact area due to the structural deformation of the pillar structure 120.

The electromechanical micro adhesive surface structure 100 proposed by the present disclosure may be manufactured by implementing the body 110 and the pillars 121 by utilizing a 3D printer and then by coating the conductive material 123 such as a silver nanowire and an insulating polymer material on each pillar 121.

Figure 4:
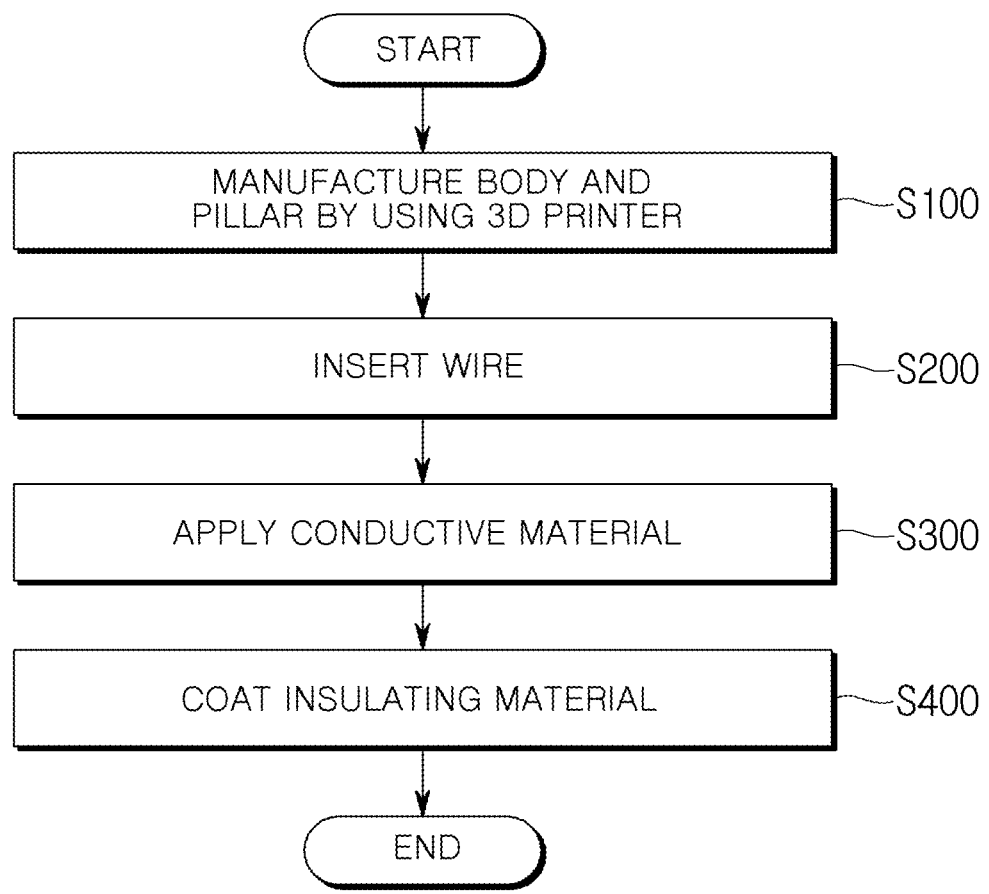
FIG. 4 is a flowchart showing a process of producing the electromechanical micro adhesive surface structure proposed by the present disclosure.

FIG. 4 is a flowchart showing a process of producing the electromechanical micro adhesive surface structure 100 proposed by the present disclosure.

Referring to FIG. 4, in step S100, the body 110 and the pillar 121 which is a portion of the surface micro structure are integrally stacked and manufactured by using a photocurable (DLP) 3D printer equipment and a photocurable elastomeric resin (flexible resin) material. Here, the angle and shape of the pillar 121 starting from the body may be variously changed. According to the embodiment, the angle of the pillar 121 with respect to the body 110 may be 15 to 75 degrees, preferably one of 15, 30, 45, 60 or 75 degrees. Further, the shape of the pillar may have a straight-line shape, a curved shape, or an arbitrary shape. Also, the passage 130 for providing wires may be formed under the surface micro structure in the body 110. According to the embodiment, the passage 130 may have a quadrant shape.

Figure 5A:
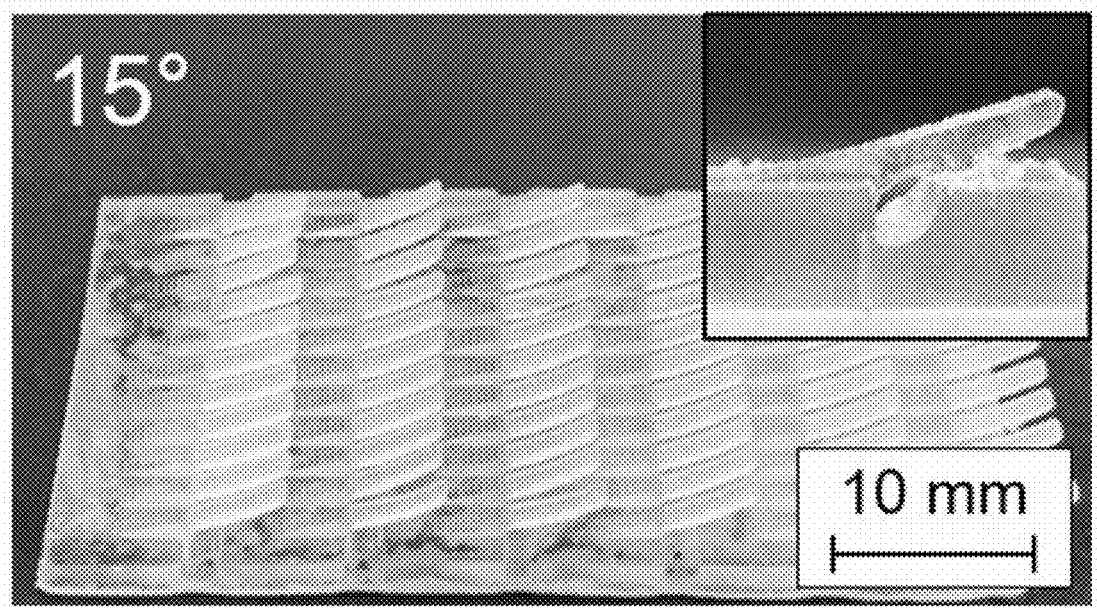
FIGS. 5A to 5E show trial products of the electromechanical micro adhesive surface structure equipped with pillars at different angles manufactured by using an additive manufacturing process.
Figure 5B:
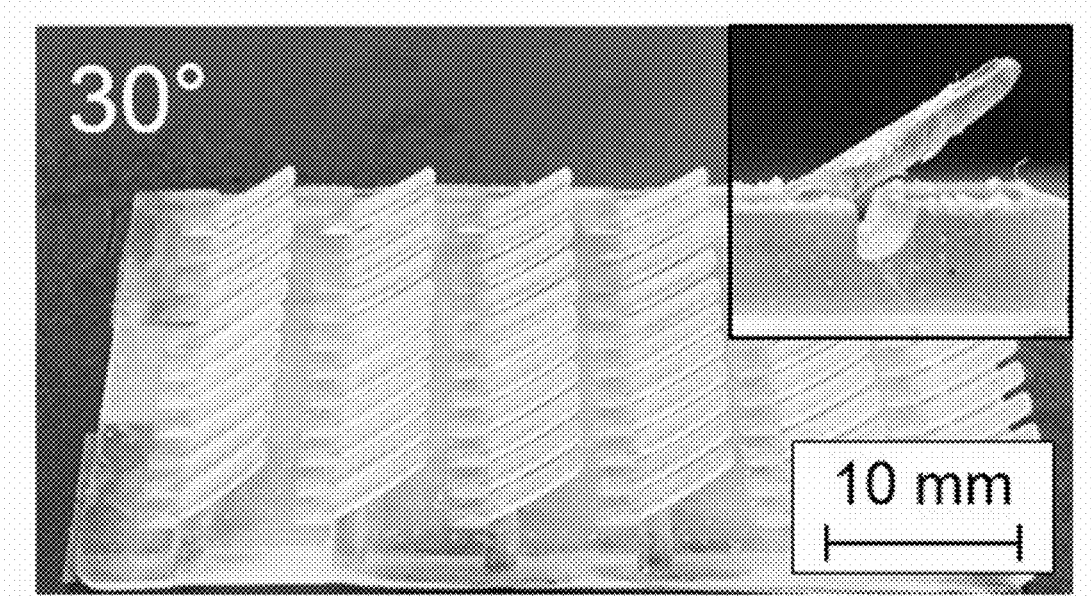
Figure 5C:
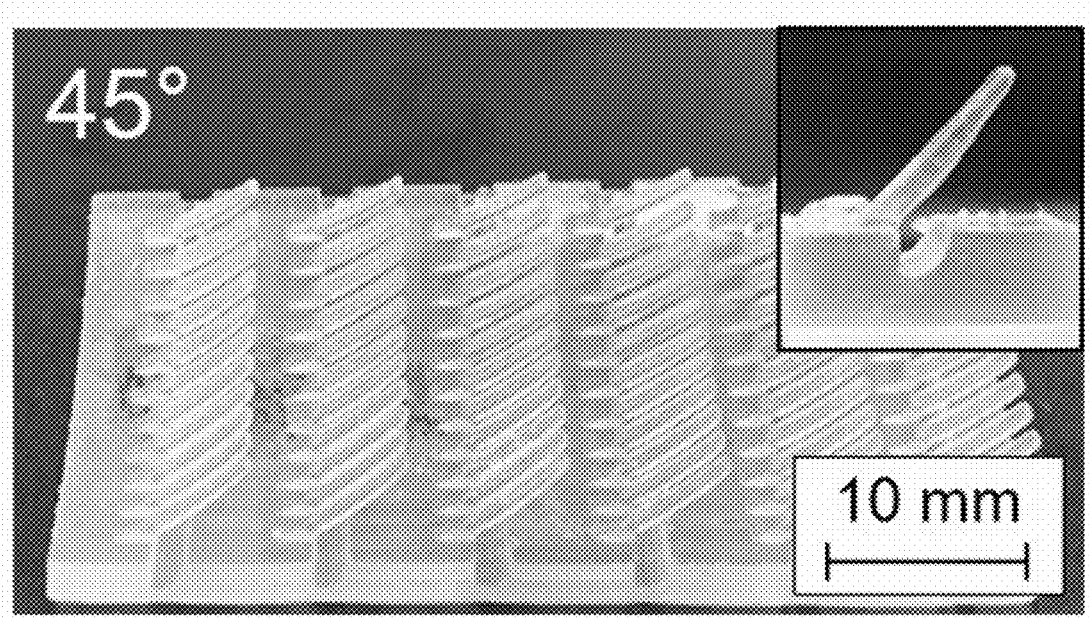
Figure 5D:
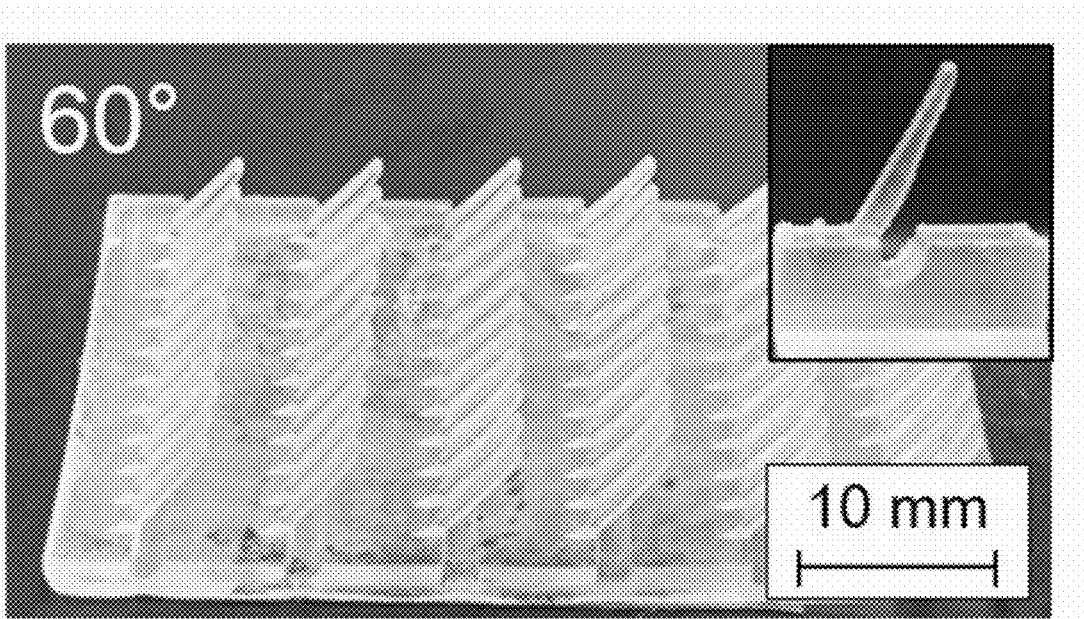
Figure 5E:
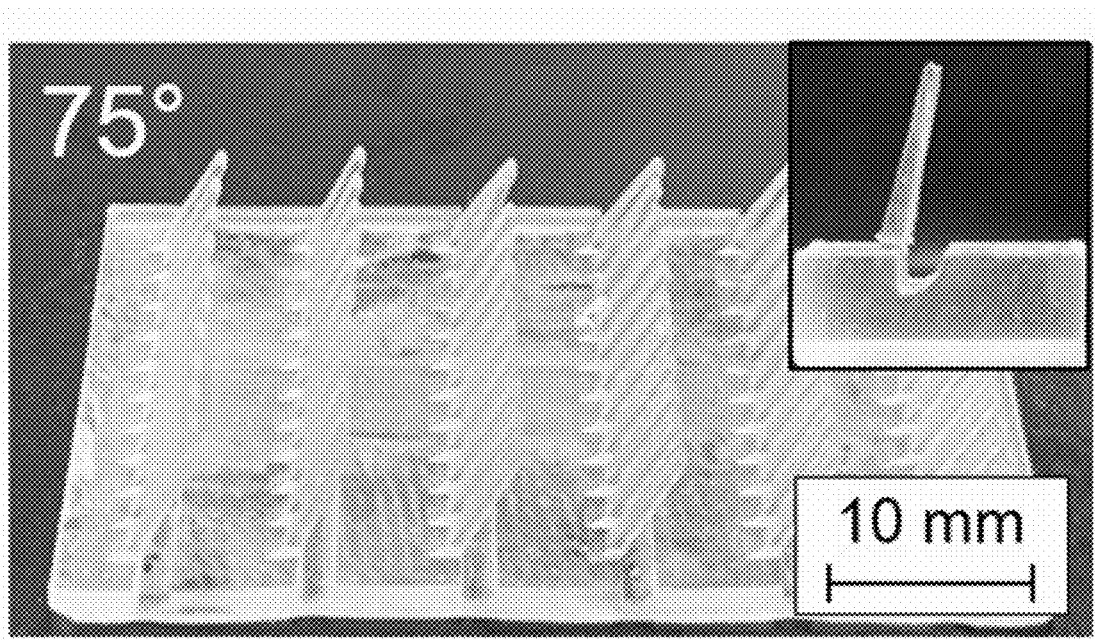
Figure 5F:
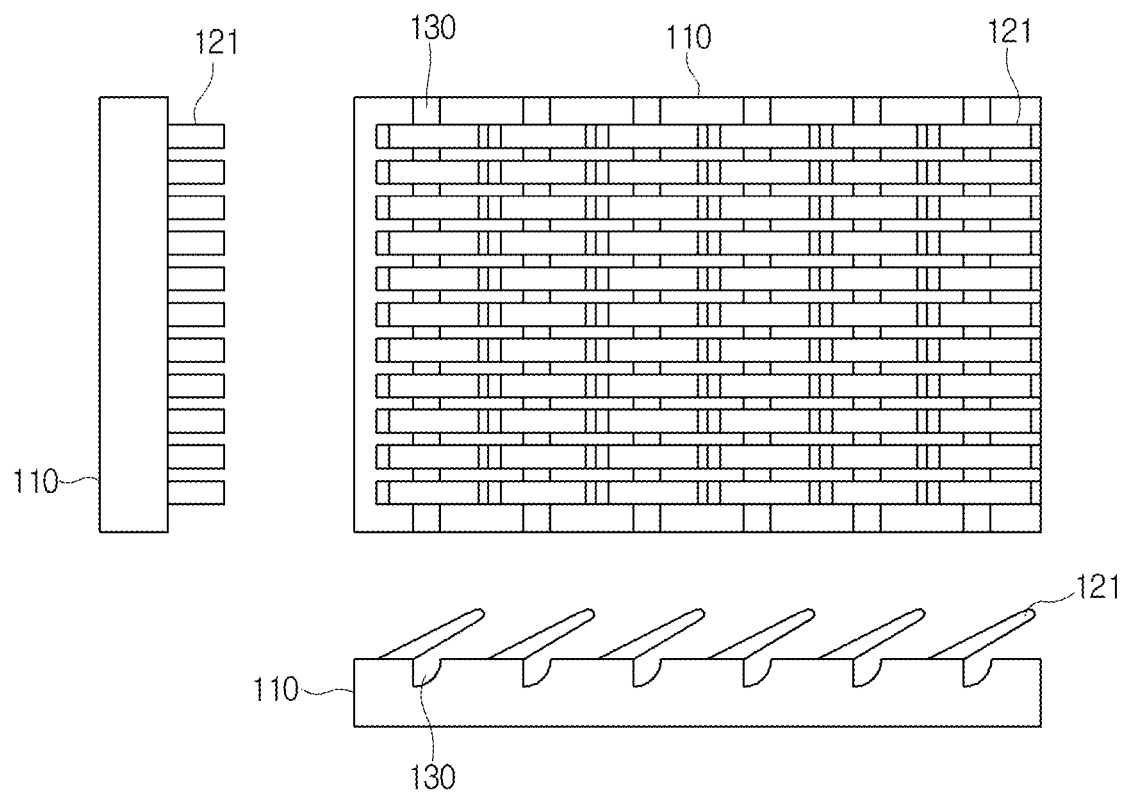
FIG. 5F is a projection diagram showing a body and pillars manufactured by a 3D printing equipment.

FIGS. 5A to 5E show trial products of the electromechanical micro adhesive surface structure 100 equipped with pillars 121 at different angles manufactured by using an additive manufacturing process. FIG. 5F is a projection diagram showing the body 110 and pillars 121 manufactured by a 3D printing equipment.

In step S200, a wire for supplying a positive (+) voltage or a negative (−) voltage to the conductive material 123 which is applied to the pillar 121 may be connected to the body 110 manufactured in step S100.

Figure 6:
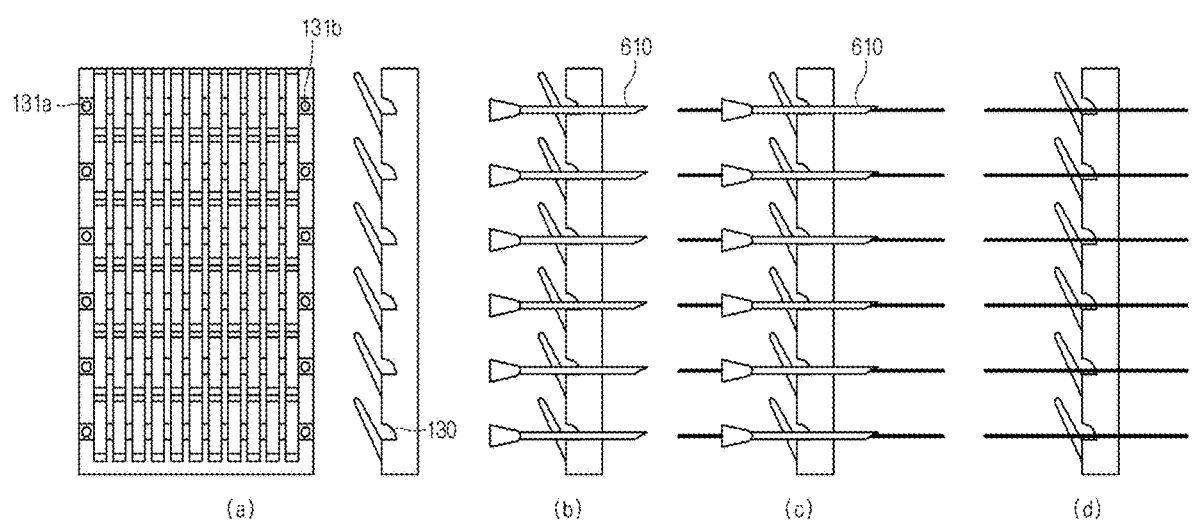
FIG. 6 is a view showing a process of connecting wires for supplying voltage to the electromechanical micro adhesive surface structure.
Figure 7:
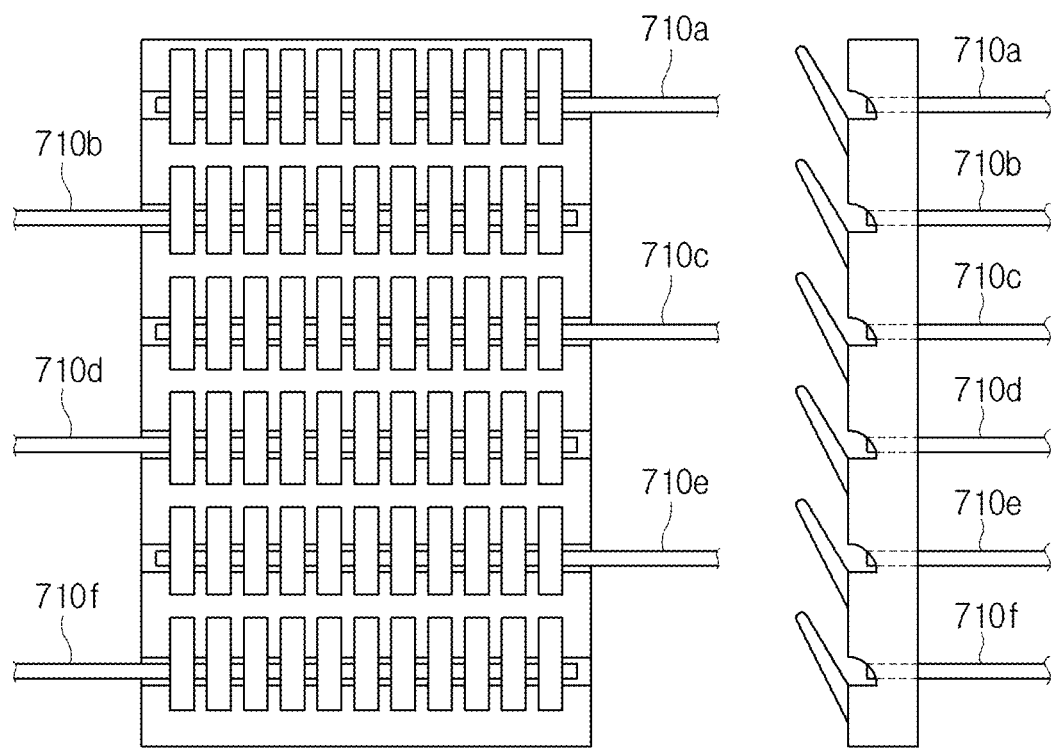
FIG. 7 shows a result of connecting the wire to the electromechanical micro adhesive surface structure.

FIG. 6 is a view showing a process of connecting wires for supplying voltage to the electromechanical micro adhesive surface structure 100. FIG. 7 shows a result of connecting the wire to the electromechanical micro adhesive surface structure 100. The wire may be positioned in the passage 130 located under the pillar structure 120.

Referring to FIG. 6, both ends 131a and 131b of the passage 130 of the micro adhesive surface structure 100 manufactured as shown in (b) of FIG. 6 are penetrated by a syringe needle 610 having a central hole formed therein. Then, after passing the wire through the syringe needle hole as shown in (c) of FIG. 6, only the wire remains as shown in (d) of FIG. 6 by removing only the syringe needle 610. Then, the remaining wire is provided in the passage 130 of the micro adhesive surface structure 100. Also, one of of the wire may be pulled out for the connection to the voltage source, and the other end may be fixed to the electromechanical micro adhesive surface structure 100. Here, the one ends that are pulled out may be in directions opposite to each other depending on the polarity of the connected voltage source. The wires (e.g., 710a, 710c, and 710e) connected to the voltage source 310 providing a positive (+) voltage may be pulled out in a first direction. The wires (e.g., 710b, 710d, and 710f) connected to the voltage source 310 providing a negative (−) voltage may be pulled out in a second direction opposite to the first direction. Also, the power supply supplied to the wire may be configured to alternately supply a positive (+) voltage and a negative (−) voltage in accordance with the column. Also, the opposite end to the one end pulled out for the connection to the voltage source may be cut out as short as possible leaving necessary portions at the back side of the surface structure so as not to be short-circuited with each other. Then, the opposite end may be applied with a photocurable elastomeric resin, cured by means of a small UV curing machine, and coated with the insulating material. Also, in a state where the wire has passed through the holes formed at both ends 131a and 131b of the passage 130 of the body 110 by the syringe needle 610, a small amount of the elastomeric resin is injected into the hole and cured by a small UV curing machine, and thus sealed. Accordingly, the wire can also be fixed without moving. Accordingly, as shown in FIG. 7, it is possible to obtain a result in which the wires 710a to 710f are connected to the electromechanical micro adhesive surface structure 100.

Subsequently, in step S300, the conductive material may be applied.

Figure 8:
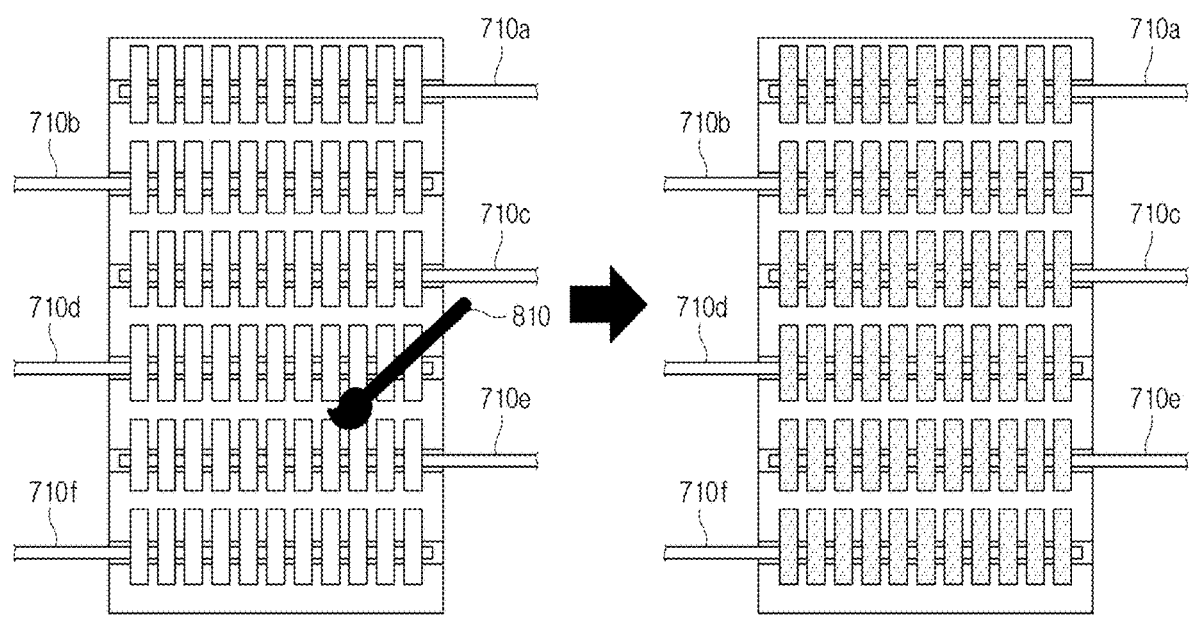
FIG. 8 is a view showing a process of applying nanowire ink that is a conductive material.

FIG. 8 is a view showing a process of applying nanowire ink that is a conductive material.

Referring to FIG. 8, silver nanowire ink is applied to both surfaces of the pillar 121 and to the wire provided in the passage 130 under the pillar 121 of the body 110 by using a tool 810 such as a brush, so that the conductive material 123 which forms an electrode pattern for electronic adhesion may be applied. Then, the micro adhesive surface structure 100 may be placed in an oven preheated to 90° C. for 5 minutes in order to cure the pillar 121 and the conductive material 123 applied to the wire.

Thereafter, in step S400, an insulating material may be coated.

Figure 9:
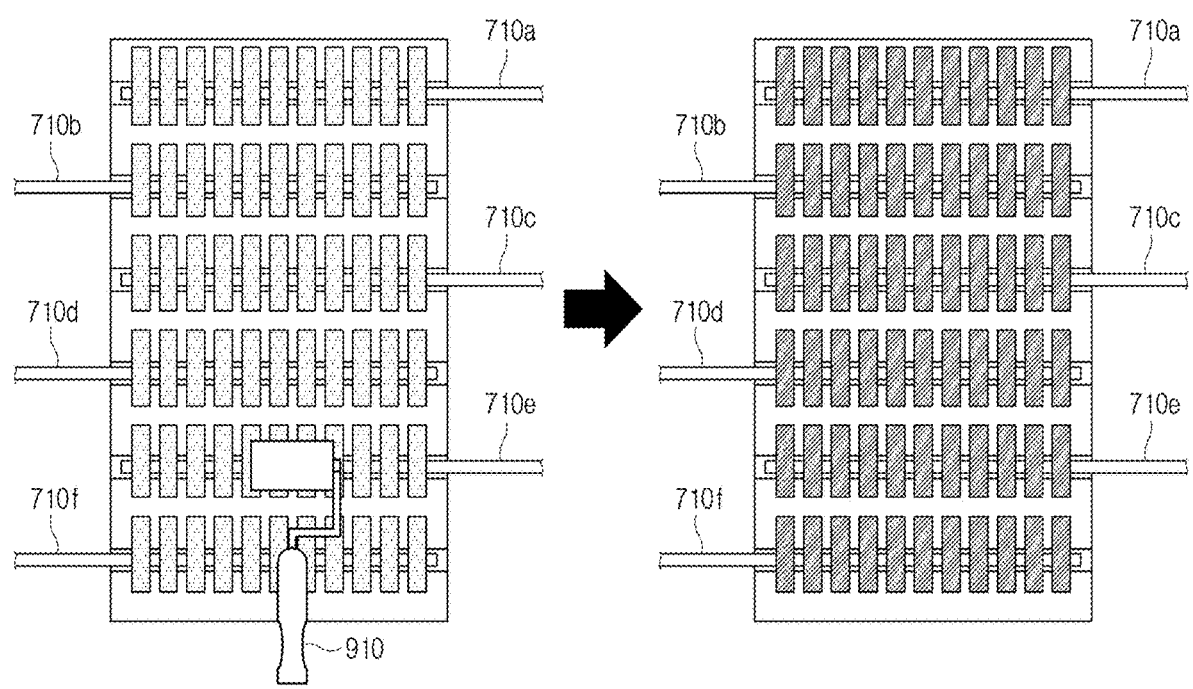
FIG. 9 is a view showing a process of coating an insulating material.

FIG. 9 is a view showing a process of coating the insulating material.

Referring to FIG. 9, both sides of the pillar 121 applied with the conductive material 123 may be applied with a thin elastomer resin in the form of a thin film by using a roller 910 and then cured by a small UV curing machine. If the insulating material is coated too thinly, there is a possibility of occurrence of discharge and short circuit. Therefore, the insulating material may be coated by applying and curing several times.

The three-dimensional micro adhesive surface structure 100 composed of the body 110 and the pillar 121, which are formed of the elastomer through the foregoing process, and the conductive material 123 and the insulating material 125 which are applied to the pillar 121 has a flexible physical property and high conductivity that allow the pillar structure 120 attached to the body 110 to maintain conductivity while electrically generating large elastic deformation, so that the effect of electromechanical adhesion can be maximized.

In order to investigate the principles and performance of the electromechanical adhesive technology based on contact mechanics, various experiments have been performed by using a manufactured trial product 1000 of the micro adhesive surface structure 100 proposed by the present disclosure.

Figure 10:
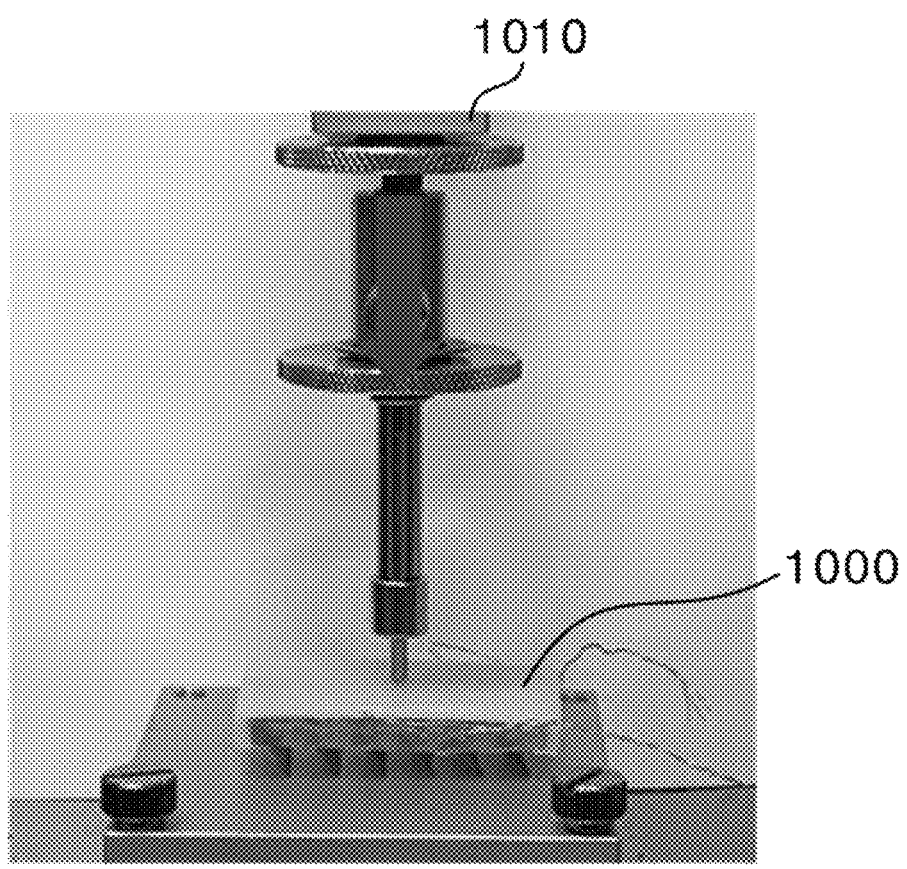
FIG. 10 shows a compression test for measuring a mechanical stiffness of the three-dimensional micro adhesive surface structure 100 proposed by the present disclosure.
Figure 11:
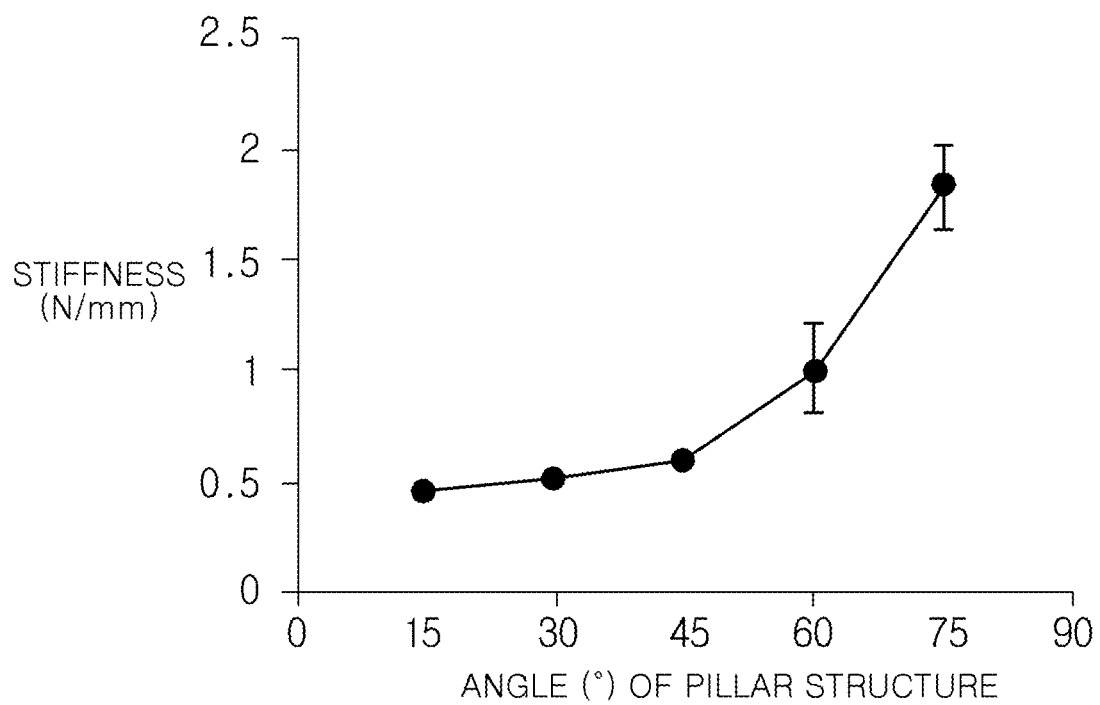
FIG. 11 is a view showing compression test results.

FIG. 10 shows a compression test for measuring a mechanical stiffness of the three-dimensional micro adhesive surface structure 100 proposed by the present disclosure. FIG. 11 is a view showing compression test results.

In FIG. 10, a total of five trial products 1000 of the micro adhesive surface structure 100 in which the angle of the pillar structure 120 attached to the body 110 is adjusted at 15-degree intervals from 15 to 75 degrees are tested by using a compression tester 1010. The test of FIG. 10 may be to measure a deformation amount caused by the angle of the pillar structure 120 with respect to the body 110 or a compressive force required to obtain a certain deformation amount. Also, the test of FIG. 10 may be to measure a change in mechanical stiffness according to the angle of the pillar structure 120 of the micro adhesive surface structure 100 by measuring the compressive force required to obtain a predetermined deformation amount (e.g., 1.5 mm).

Referring to the test results of FIG. 11, it can be found that the stiffness increases as the angle of the pillar structure 120 attached to the body 110 increases, and in particular, it can be seen that the stiffness rapidly changes in the structure having 45° or more. Also, it can be appreciated that the angle of the pillar structure 120 increases, not only bending but also buckling has much influence, and thus, the force acting for the deformation is rapidly increased and big errors occur.

Figure 12:
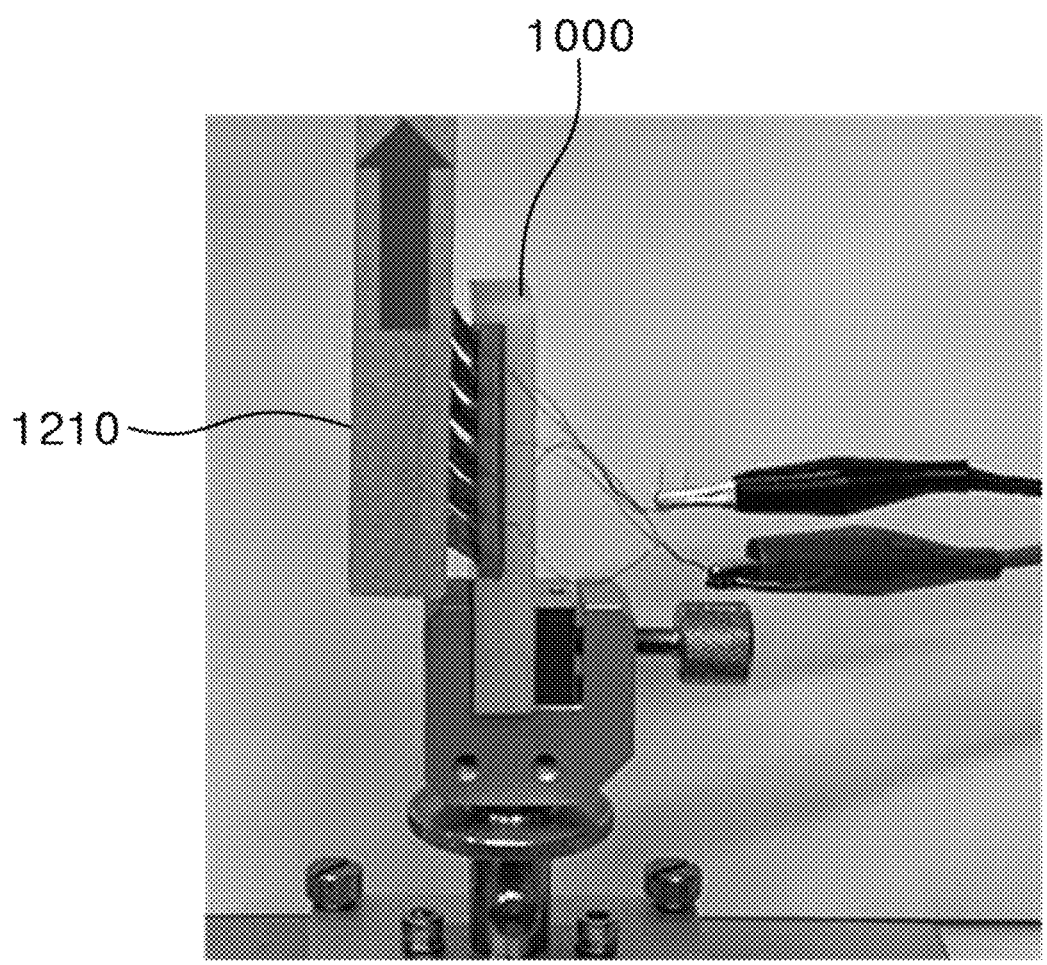
FIG. 12 shows an adhesive force test for measuring adhesive force changes when external voltage is applied to the three-dimensional electromechanical micro adhesive surface structure 100 proposed by the present disclosure.
Figure 13:
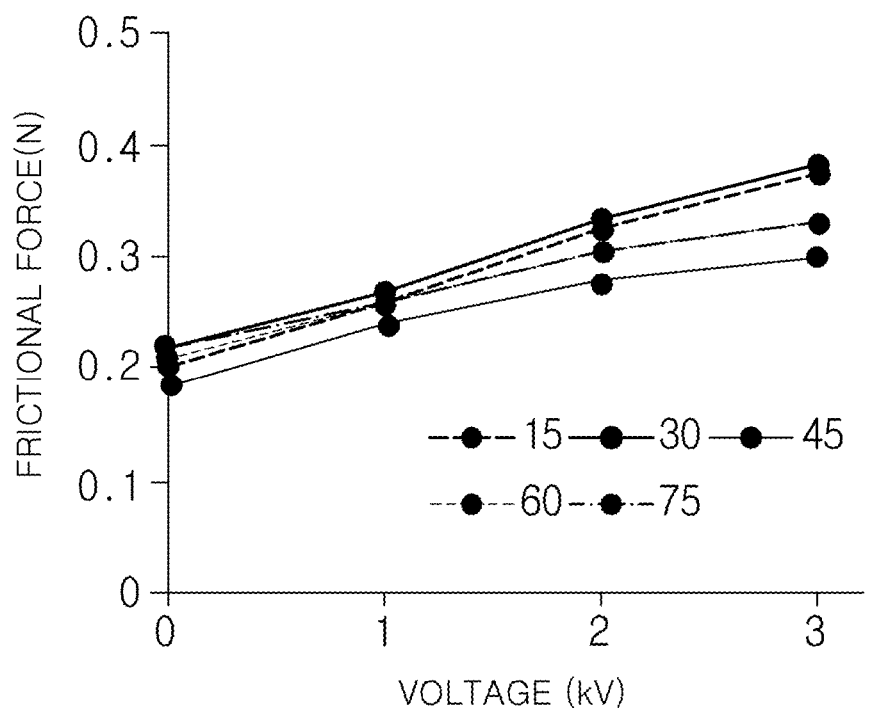
FIG. 13 is a view showing adhesive force test results.

FIG. 12 shows an adhesive force test for measuring adhesive force changes when external voltage is applied to the three-dimensional electromechanical micro adhesive surface structure 100 proposed by the present disclosure. FIG. 13 is a view showing adhesive force test results.

Referring to FIG. 12, an adhesive force test is performed by a total of five trial products 1000 of the micro adhesive surface structure 100 in which the angle of the pillar structure 120 attached to the body 110 is adjusted at 15-degree intervals from 15 to 75 degrees. The test of FIG. 12, may be to measure the adhesive force by vertically fixing the three-dimensional electromechanical micro adhesive surface structure 100, by bringing an opponent material 1210 made of wood into contact, and then by rubbing at a constant speed. In the test of FIG. 12, after the opponent material 1210 is brought into contact such that a pure mechanical adhesive force without voltage applied is 0.2 N (±0.02 N), the adhesive force may be measured while applying a high voltage of 1, 2, and 3 kV. In the test of FIG. 12, an average adhesive force in a section of 3 to 9 mm after a stop friction section is measured while the opponent material 1210 made of wood is moved at a moving speed of 20 mm/min and a travel distance of 10 mm.

FIG. 13 shows changes in the adhesive force of five surfaces having different angles of the pillar structure 120 with respect to the body 110. Although the result of FIG. 13 shows the frictional force, the frictional force and the adhesive force may be proportional to each other from the viewpoint that the greater the adhesive force, the greater the frictional force. Referring to FIG. 13, it was found that the adhesive force is improved as the applied voltage in a range of 0 kV to 3 kV increases.

Based on the mechanical stiffness test result and the adhesion test result according to the applied voltage, the following principle of the electromechanical adhesion may be described.

Figure 14:
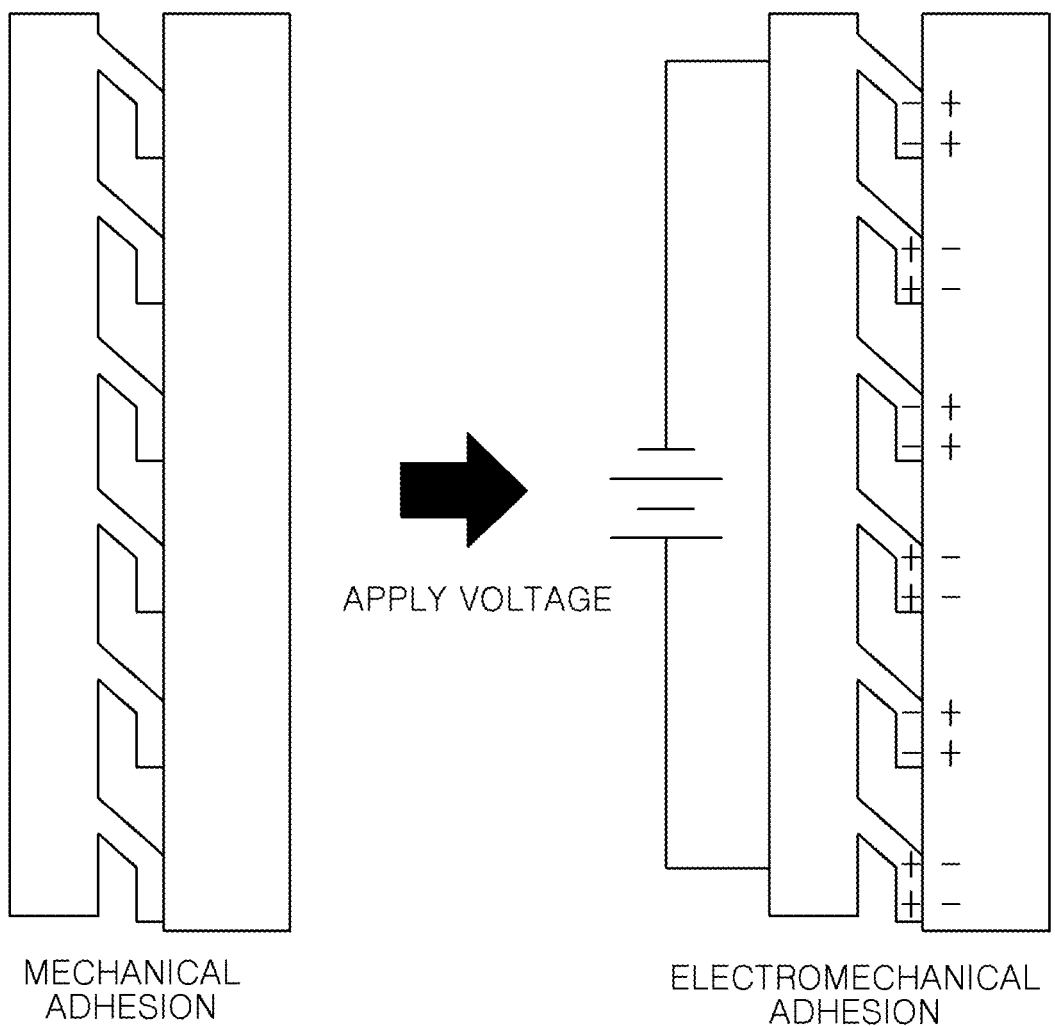
FIG. 14 is a view showing a principle of electromechanical adhesion.
Figure 15:
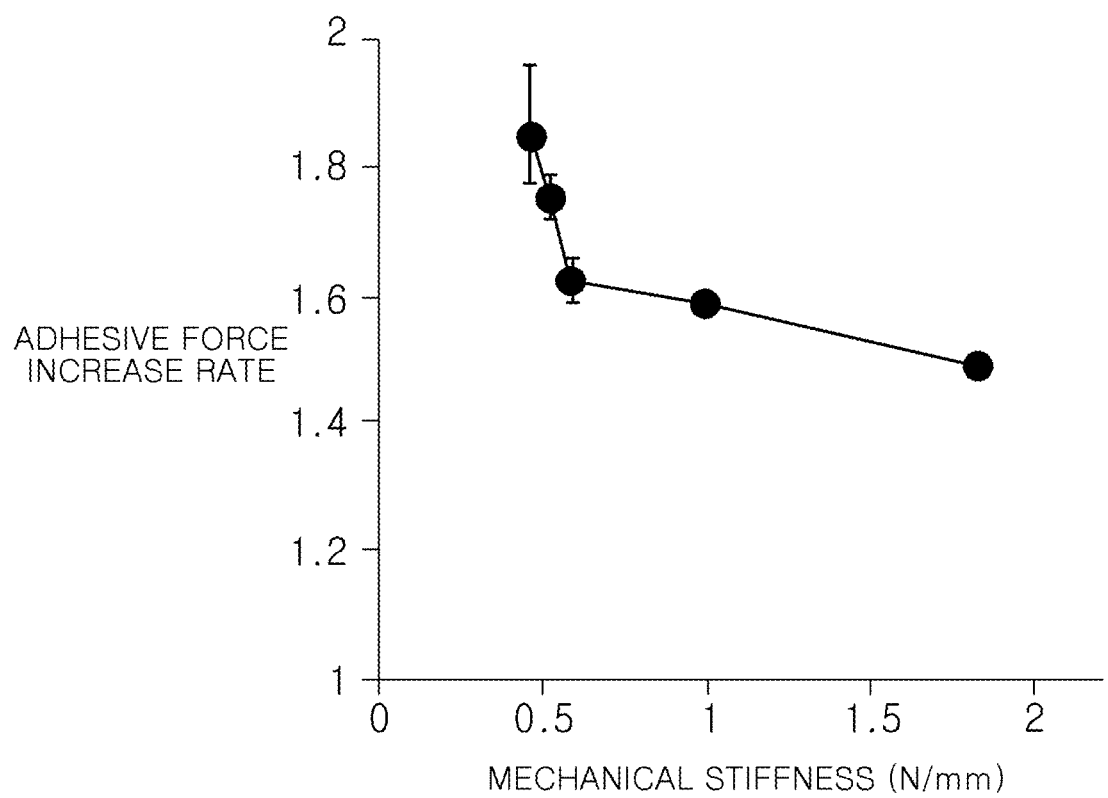
FIG. 15 is a graph showing an adhesive force increase rate of a case of applying voltage when compared with a simple mechanical stiffness of the micro adhesive surface structure 100.

FIG. 14 is a view showing a principle of the electromechanical adhesion. FIG. 15 is a graph showing an adhesive force increase rate of a case of applying voltage when compared with a simple mechanical strength of the micro adhesive surface structure 100.

Referring to FIG. 14, when a positive (+) voltage and a negative (−) voltage are, as shown in FIG. 3, applied to each column of the micro adhesive surface structure 100, an electrostatic attraction to the opponent surface is generated by a principle of electronic adhesion. Here, the smaller the mechanical stiffness of the micro adhesive surface structure 100, the greater the mechanical deformation due to electrostatic attraction. Due to this, the contact area between the micro adhesive surface structure 100 and the surface of the opponent object increases. As the contact area increases, high mechanical friction can be expected.

When the angle of the pillar structure 120 of the micro adhesive surface structure 100 with respect to the body 110 is between 15 and 45 degrees, the mechanical stiffness may be in a range of from 0.4 to 0.6 N/mm. Referring to FIG. 15, when the mechanical stiffness is in the range of from 0.4 to 0.6 N/mm, the adhesive force increase rate is greatly affected by the external applied voltage. On the other hand, when the angle of the pillar structure 120 exceeds 45 degrees and the mechanical stiffness is greater than 0.6 N/mm, there is an effect caused by the external applied voltage, but the effect is relatively low.

In summary, the following conclusion can be made based on the result of FIG. 15. When a voltage is applied to the three-dimensional electromechanical micro adhesive surface structure 100, the electrostatic attraction is generated first by the principle of electronic adhesion, and additionally, the mechanical adhesive force is also increased by the increase in the contact area due to the structural deformation of the pillar structure 120.

In the three-dimensional micro adhesive surface structure 100 for implementing the electromechanical adhesion, a capacitor may be formed because two adjacent columns are connected to different poles. That is, a capacitance of a certain size between the pillar structures 120 in two columns in the three-dimensional micro adhesive surface structure 100. However, when the pillar structure 120 is deformed due to external factors, a change in the capacitance is caused. Tactile sensing is possible by detecting the change in the capacitance. The change in the capacitance depending on the contact position, force and deformation depth, material, and contact area may be measured by using a measuring device such as a multimeter (CEM, DT-6500).

Figure 16:
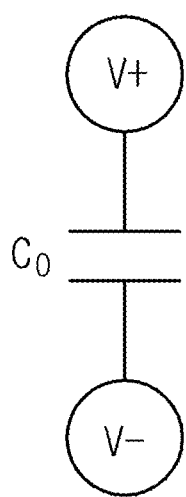
FIG. 16 is a view showing an example of a capacitance between adjacent pillar structures in two columns having mutually different polarities in the three-dimensional micro adhesive surface structure and an example of a change in the capacitance when contacting with the object.
Figure 16:
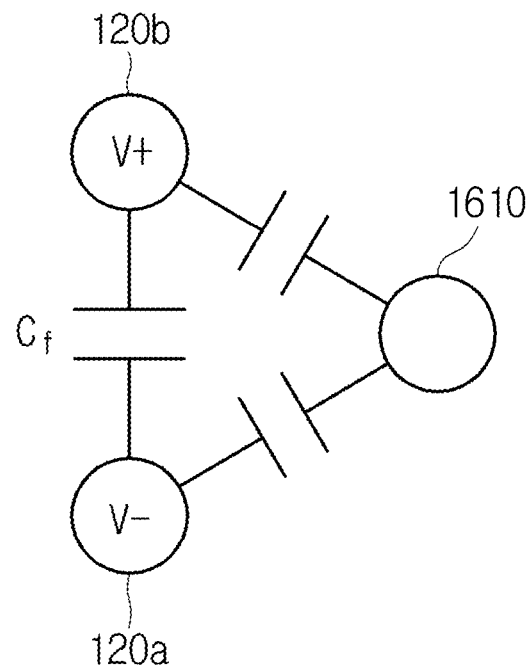

FIG. 16 is a view showing an example of the capacitance $C_0$ between adjacent pillar structures 120 in two columns having mutually different polarities in the three-dimensional micro adhesive surface structure 100 and an example of a change in the capacitance $C_f$ when contacting with the object 1610.

Referring to (a) of FIG. 16, the controller 330 of FIG. 3 may apply additionally an AC voltage in addition to a positive (+) voltage and a negative (−) voltage to the conductive material 123 included in the adjacent pillar structures (e.g., 120a and 120b) and may measure a current flowing through the two adjacent pillar structures (e.g., 120a and 120b). Here, the adjacent pillar structures perform a function of the capacitor and the current by I=C dv/dt may be measured by the applied AC voltage. Therefore, the capacitance $C_0$ may be determined based on the applied AC voltage and the measured current.

Similarly, referring to (b) of FIG. 16, when the micro adhesive surface structure 100 contacts the object 1610, the object 1610 and the pillar structures (e.g., 120a and 120b) may function as a capacitor. Accordingly, the capacitance $C_f$ between the two adjacent pillar structures (e.g., 120a and 120b) may be changed. The controller 330 of FIG. 3 may determine the changed capacitance $C_f$ on the basis of the current measured after the AC voltage is applied.

Experiments related to the change in the capacitance in the three-dimensional micro adhesive surface structure 100 proposed by the present disclosure have been performed, and the experiment other than an experiment related to the change in the capacitance according to the deformation depth and force have been performed only on the micro adhesive surface structure 100 in which the angle of the pillar structure 120 is 15 degrees.

Figure 17:
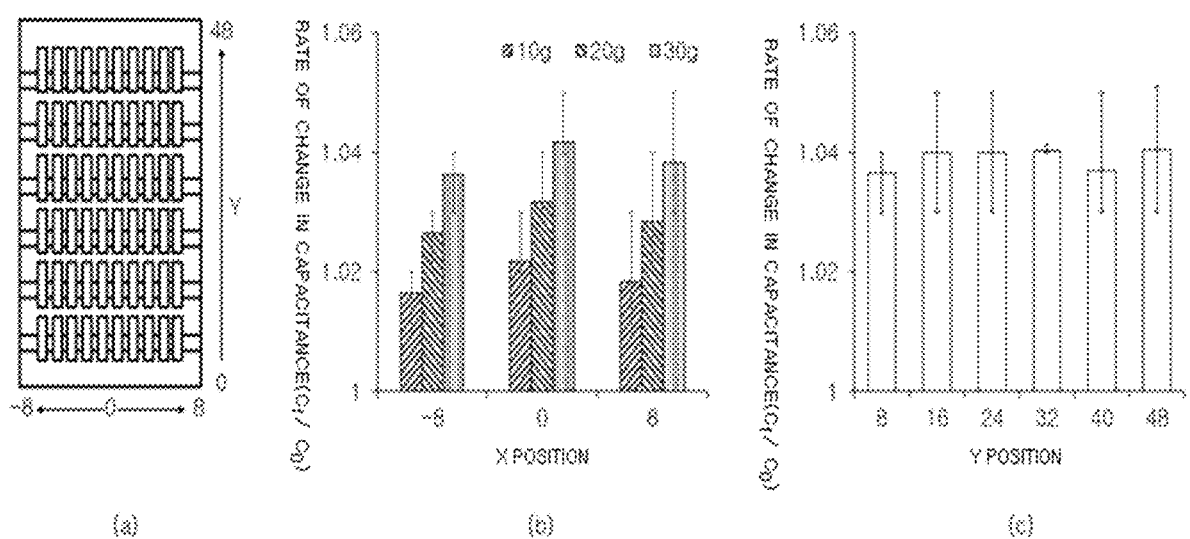
FIG. 17 is a view showing a change in the capacitance according to positions.

FIG. 17 is a view showing the change in the capacitance according to positions.

As shown in (a) of FIG. 17, the experiment related to the change in the capacitance according to positions is to measure the change in the capacitance in each row and each column of the micro adhesive surface structure 100.

In (b) of FIG. 17, the weight of the opponent object in contact with the surface structure is represented as 10 g, 20 g, or 30 g. Referring to the experimental results shown in (b) of FIG. 17, it can be seen that as the weight of the opponent object increases, the rate of the change in capacitance is large. However, it can be seen from the experimental results shown in (b) and (c) of FIG. 17 that the change in the capacitance according to positions in all the rows and columns is within a range of 1%. Through this experiment, it can be found that when the object comes in contact with an arbitrary position, a similar capacitance measured value can be obtained.

Figure 18:
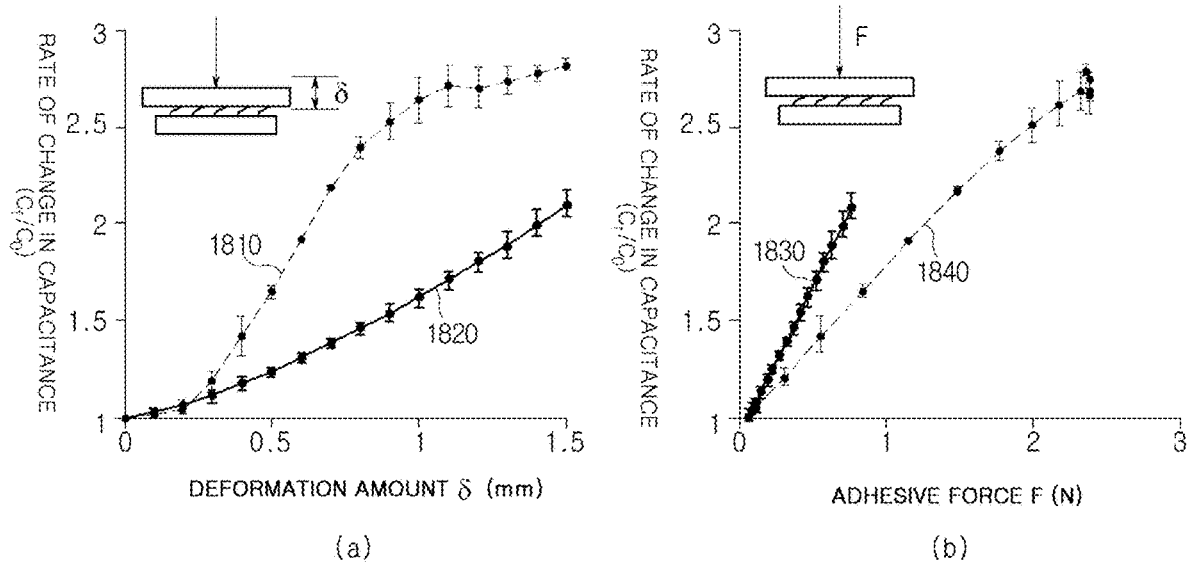
FIG. 18 is a view showing the change in the capacitance according to deformation depth and force.

FIG. 18 is a view showing the change in the capacitance according to deformation depth and force.

Referring to FIG. 18, according to the experiment related to the changes in the capacitance according to the deformation depth and force, the amount of change in the capacitance according to the force and deformation depth are measured by applying a force to the entire micro adhesive surface structure 100. FIG. 18 shows the results 1810 and 1830 obtained by using the micro adhesive surface structure in which the angle of the pillar structure 120 is 30 degrees and shows the results 1820 and 1840 obtained by using the micro adhesive surface structure in which the angle of the pillar structure 120 is 60 degrees. As shown in FIG. 18, it can be seen that the amount of the change in the capacitance increases as the deformation depth and force increase. That is, if the amount of the change in the capacitance of the electromechanical micro adhesive surface structure 100 proposed by the present disclosure is measured, the contact force is detected and information on the magnitude thereof can also be obtained.

Figure 19:
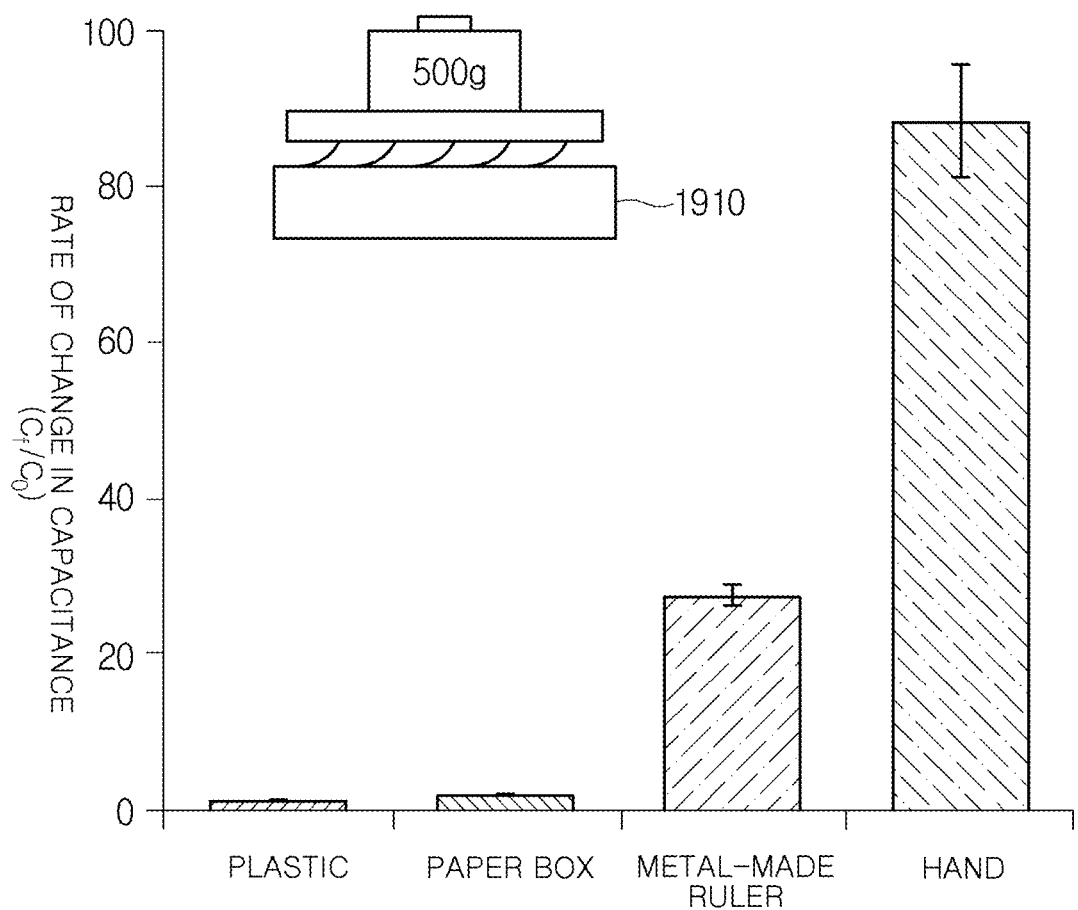
FIG. 19 is a view showing an amount of the change in the capacitance according to a material of an opponent surface object to be gripped by the micro adhesive surface structure.

FIG. 19 is a view showing the amount of the change in the capacitance according to a material of an opponent surface object 1910 to be gripped by the micro adhesive surface structure 100.

The amount of the change in the capacitance according to the material is measured by turning the three-dimensional micro adhesive surface structure 100 upside down and placing on the surfaces of the objects 1910 of different materials, and then by placing a weight weighing 500 g thereon and applying the same force. In the case of metal, the experiment is performed by placing A4 paper on the object 1910 in order to prevent a short circuit from occurring. Referring to FIG. 19, as a result of the experiment, while a plastic has a change rate of 24% and a paper box has a change rate of 32%, a metal-made ruler has a large change rate of 280% and hand contact has a large change rate of 8,800%. Therefore, it can be appreciated from the experimental results that the rate of the change in capacitance of the conductor is higher than that of the non-conductor.

Figure 20:
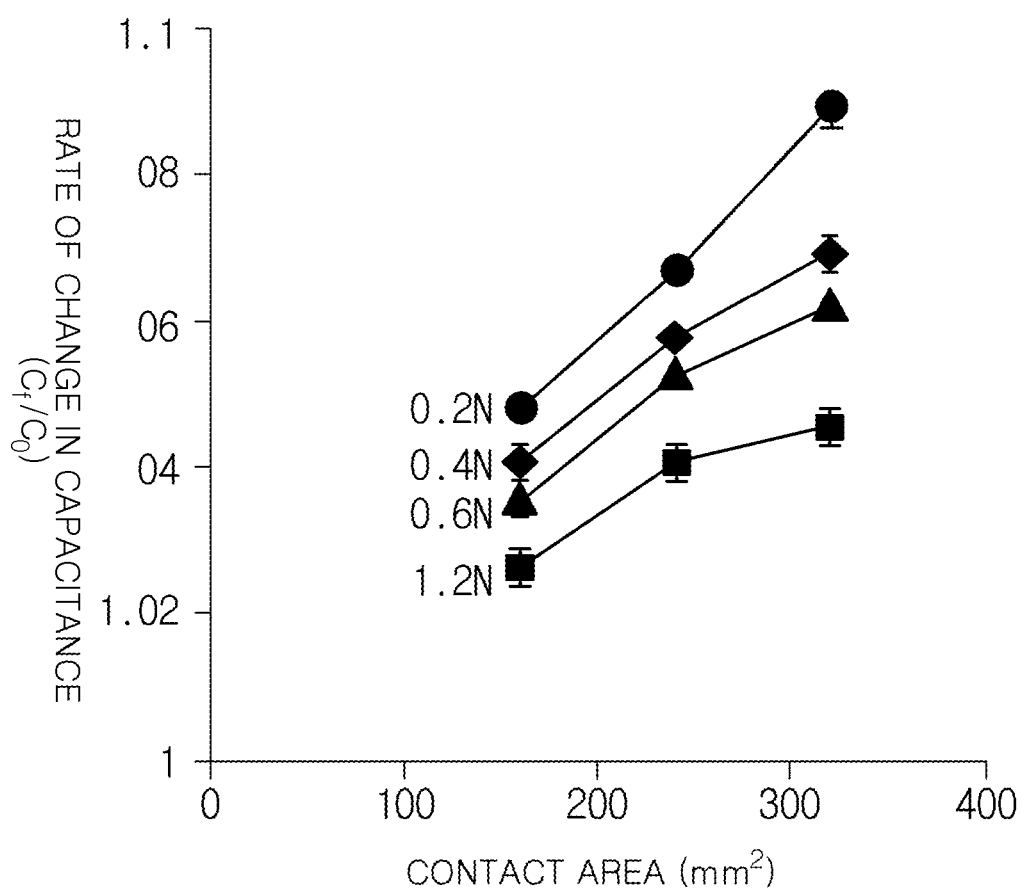
FIG. 20 is a view showing the amount of the change in the capacitance according to a contact area.

FIG. 20 is a view showing the amount of the change in the capacitance according to the contact area.

The rate of the change in capacitance according to the contact area is measured by applying the same force. As shown in FIG. 19, it can be seen that the change in the capacitance increases as the area increases. In particular, the amount of the change in the capacitance when the area is doubled for the same force is measured greater than that when the force is doubled for the same contact area. That is, it can be confirmed that the contact area is important in detecting the contact.

Figure 21:
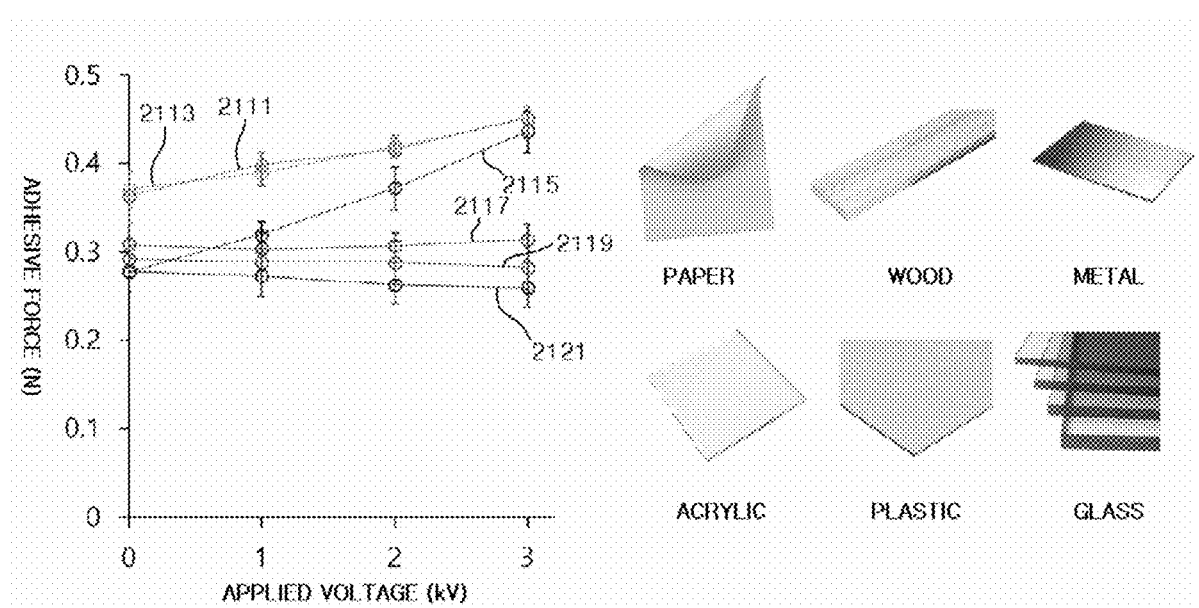
FIG. 21 is a view showing adhesive force measurement results according to an applied voltage to a total of six materials of paper, wood, metal, acrylic, plastic, and glass.

FIG. 21 is a view showing adhesive force measurement results according to an applied voltage to a total of six materials of paper 2111, wood 2115, metal 2113, acrylic 2117, plastic 2119, and glass 2121.

Referring to FIG. 21, in the electromechanical adhesion, both conductive and non-conductive materials are theoretically able to induce the electrostatic attraction. However, in the electromechanical adhesion test using the three-dimensional micro adhesive surface structure 100, meaningful adhesive force changes can be measured only for wood and paper. In the case of the wood 2115 and paper 2111, it can be found that the adhesive force is clearly changed according to the change in the applied voltage and the adhesive force is improved as the applied voltage is increased. In the case of the metal, it can be seen that the adhesive force increases due to the increase in the voltage. However, for the reason that the metal has a good conductivity, when the applied voltage exceeded 2 kV, a short circuit occurs sometimes. In the case of the acrylic 2117, plastic 2119, and glass 2121, the adhesive force little changes according to the change in the applied voltage. In particular, in the case of the acrylic and plastic, the adhesive force does not change at all and a phenomenon in which the adhesive force becomes rather poor within an error range.

Figure 22:
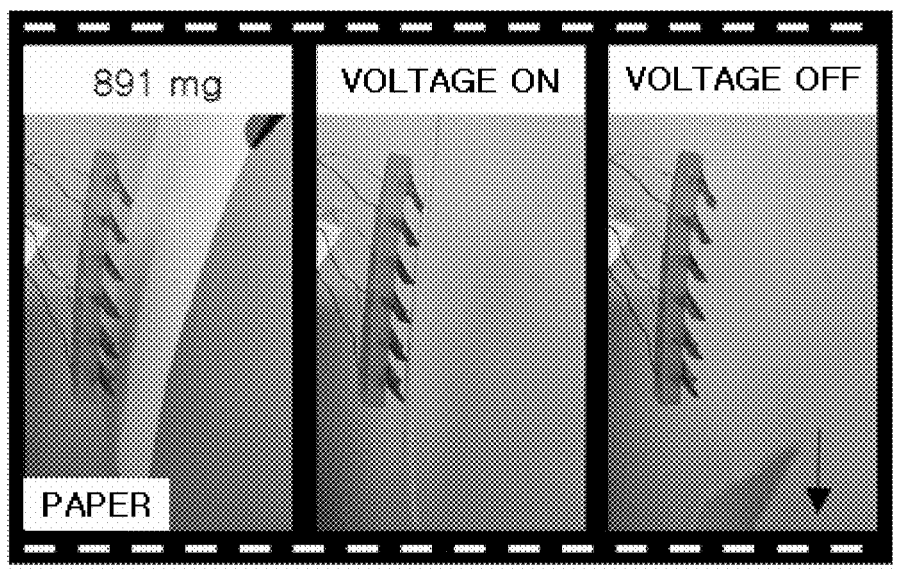
FIG. 22 is a view showing images of moments when paper of 891 mg and aluminum foil of 1,056 mg are adhered to the three-dimensional micro adhesive surface structure when a voltage of 3 kV is applied to the three-dimensional micro adhesive surface structure, and images of moments when the adhered paper and aluminum foil drop due to the reduction of the adhesive force when the voltage is removed.
Figure 22:
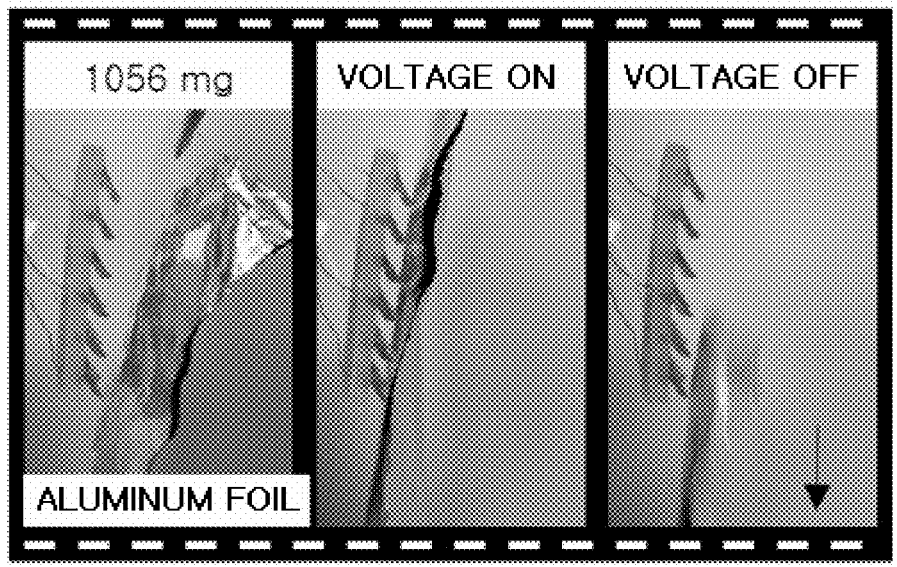

FIG. 22 is a view showing images of moments when paper of 891 mg and aluminum foil of 1,056 mg are adhered to the three-dimensional micro adhesive surface structure when a voltage of 3 kV is applied to the three-dimensional micro adhesive surface structure, and images of moments when the adhered paper and aluminum foil drop due to the reduction of the adhesive force when the voltage is removed.

Referring to FIG. 22, it can be experimentally confirmed that through the use of the three-dimensional micro adhesive surface structure 100, the object can be gripped even only by the applied voltage without a separate vertical load.

As an embodiment for further amplifying the adhesive force on the basis of the degree of understanding obtained through this study, if the mechanical stiffness of the pillar structure 120 of the three-dimensional electromechanical micro-adhesive surface structure 100 is minimized, the contact area with the opponent object by the electrostatic force according to the applied voltage is increased, the adhesive force synergistic effect can be maximized. Also, according to another embodiment, the three-dimensional electromechanical micro-adhesive surface structure 100 proposed by the present disclosure is manufactured in the form of a multi-faceted integral gripper, so that the adhesive force can be increased. In other words, when the electromechanical micro adhesive surface structure proposed by the present disclosure is applied to each finger of the robot gripper and gripping with vertical load is attempted, the rate of the change in the adhesive force according to the applied voltage can be increased, so that it is determined that the functional operation of gripping the object can be performed.

Figure 23:
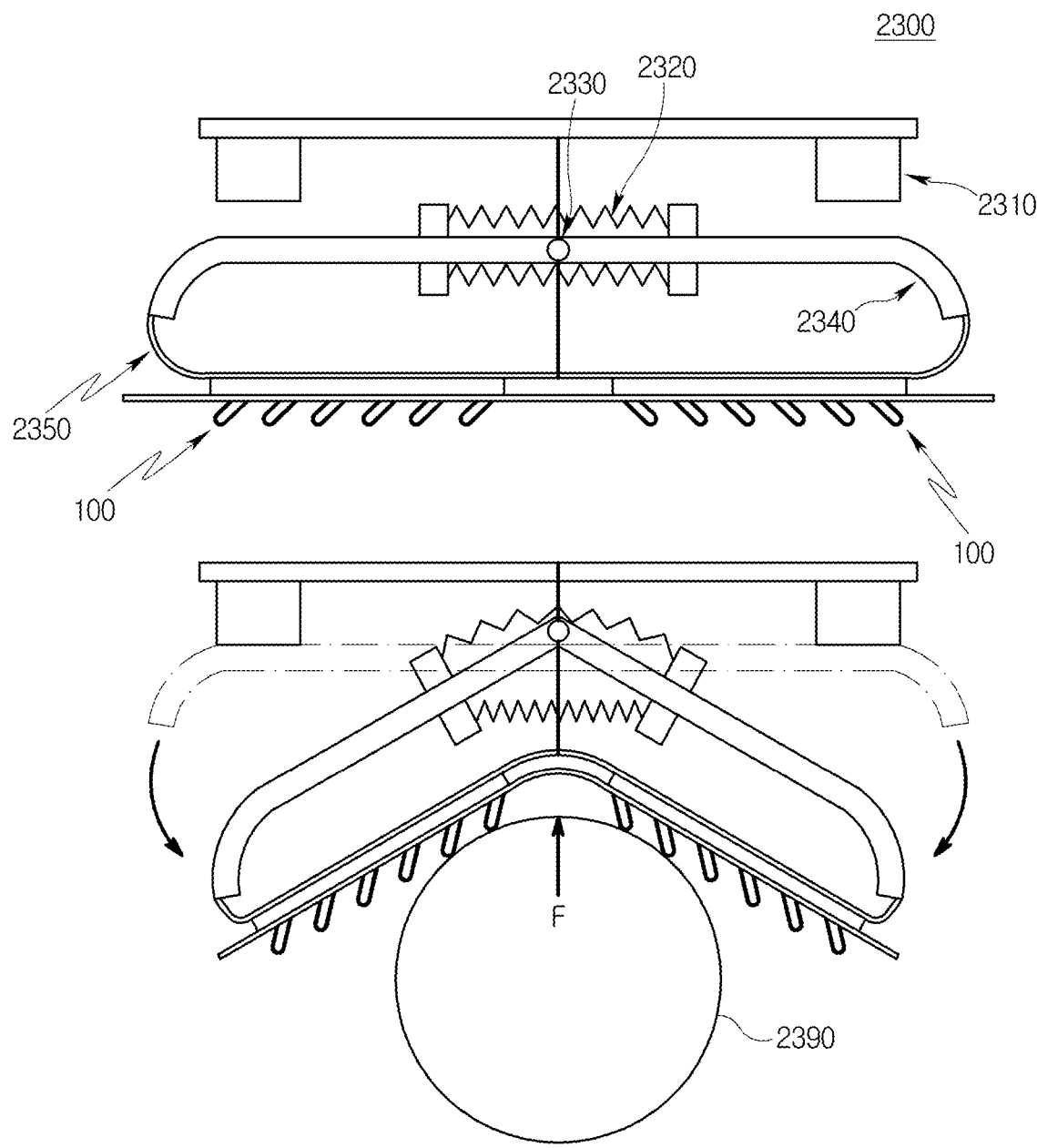
FIG. 23 is a view showing an example of a gripper to which the electromechanical micro adhesive surface structure proposed by the present disclosure is applied.

FIG. 23 is a view showing an example of a gripper to which the electromechanical micro adhesive surface structure 100 proposed by the present disclosure is applied.

Referring to FIG. 23, the gripper 2300 has a hinge 2330 and a spring 2320 positioned at the center thereof and controls the bending of the support 2340. When the gripper 2300 presses the object 2390 to grip, both the supports 2340 may be bent around the hinge 2330 by receiving a force F. Then, the electromechanical micro adhesive surface structure 100 proposed by the present disclosure may be attached to a polyimide film 2350 and connected to the support 2340. According to the embodiment, in the electromechanical micro adhesive surface structure 100, the angle of the pillar structure 120 attached to the body 110 is 30 degrees and the pillar structure 120 may have an array of 10×6. Also, two electromechanical micro adhesive surface structures 100 may be manufactured and attached to the polyimide films 2350 on both sides of the hinge 2330, respectively. According to the embodiment, the polyimide film 2350 may be 0.05 mm thick. Additionally, the gripper 2300 may have a bumper (e.g., a sponge) 2310 in order to prevent the support from colliding with an upper holder by the operation of the spring 2320.

When the gripper 2300 presses the object 2390 in order to grip the object 2390, the support 2340 is bent by receiving a force by a repulsive force, and thus, the electromechanical micro adhesive surface structure 100 comes in contact with the object 2390 to be gripped and effectively grips the object 2390. In particular, the pillar structure 120 of the electromechanical micro adhesive surface structure 100 is manufactured on the basis of an elastomer, and thus, is easily bent. Thus, the mechanical adhesive force can be further increased. Also, a voltage may be additionally supplied in order to increase the adhesive force by the electrostatic force.

In order to investigate a maximum weight that the gripper 2300 can lift, a force of pure mechanical gripping without an applied voltage and a force of electromechanical gripping with 3 kV voltage applied are measured by a tensile tester. A short cylindrical object with a diameter of 80 mm is used for the gripping test. The test is performed with the polypropylene (PP) or paper surface of the object. After the gripper 2300 contacts the object and folds into an adhesive state, the maximum tensile force before the gripper slips on the surface is measured while the object is pulled at 50 mm/min.

Figure 24:
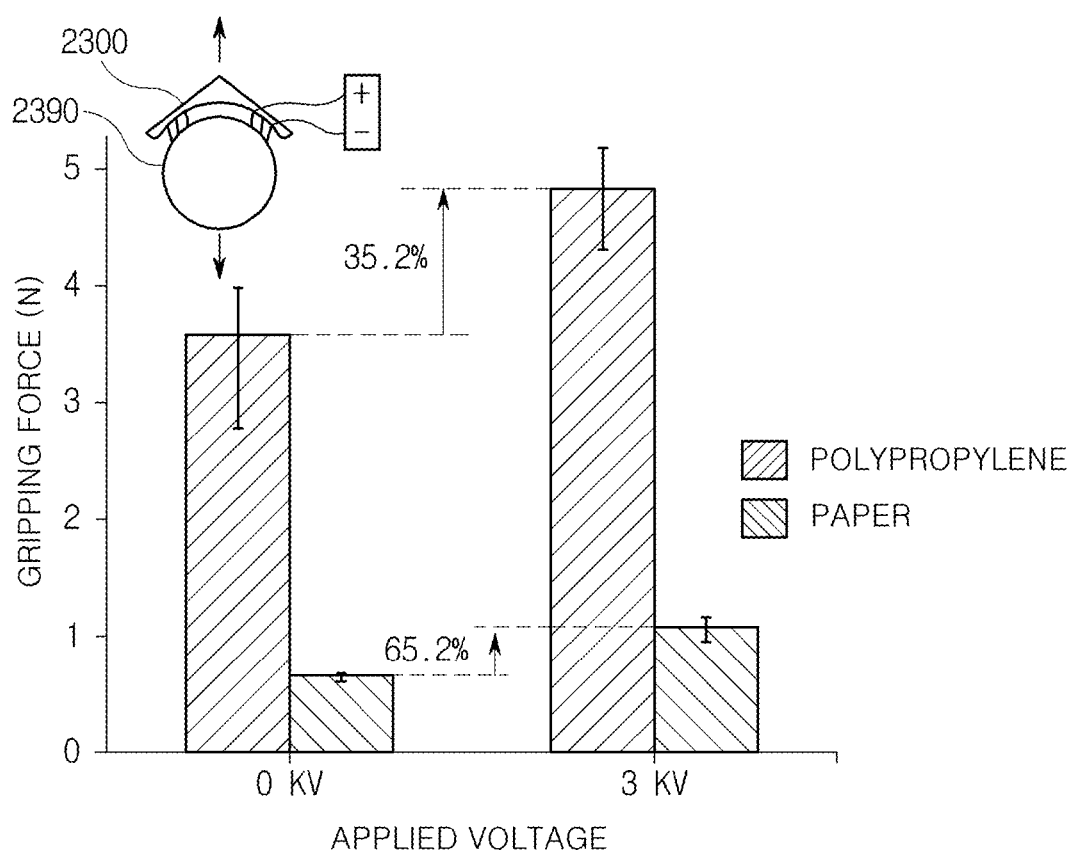
FIG. 24 is a view showing experimental results of a gripping force of the gripper 2300.

FIG. 24 is a view showing experimental results of a gripping force of the gripper 2300.

Referring to FIG. 24, it can be seen that the electromechanical gripping force obtained by applying a voltage of 3 kV is greater than the gripping force based on pure mechanical contact. When the surface of the object is made of polypropylene, it can be found that while the maximum gripping force of the pure mechanical gripping is 3.61 N, an average gripping force is increased by 35.2% to 4.74 N when a voltage of 3 kV is applied. When the surface of the object is made of paper, the maximum gripping force of the pure mechanical gripping is only 0.654 N. However, when a voltage of 3 kV is applied, the maximum gripping force is increased by 65.2% to 1.08 N.

In the electromechanical micro adhesive surface structure proposed by the present disclosure, the less the adhesive force due to the pure mechanical stiffness to be adhered, the higher the rate of the change in the adhesive force according to the applied voltage.

The usefulness of a robot is maximized only when the robot performs a function that cannot be performed by a human. However, a current object handling technology cannot perform even a half of the functions that human hands and fingers can perform. The reversible manipulation function of the adhesive force is a special function possessed by only a small number of specific individuals, such as lizards, etc., and the present disclosure intends to effectively combine the reversible manipulation function with an artificial electronic adhesive technology and to maximize the function. A new surface technology to which not only the manipulation function of the adhesive force but also a tactile sensing function essential to the gripping operation with a sense of feeling is added is developed, so that the efficiency can be improved. For the purpose of implementation of gripping which is more functional and has more sense of feeling than human hands, a new solution is proposed through the fusion of nano materials and the latest adhesive technologies.

According to various embodiments, the surface structure proposed by the present disclosure may include the body, the plurality of three-dimensional micro pillar structures attached to the body at a certain angle, and the wire for supplying a voltage to the plurality of three-dimensional micro pillar structures.

Also, the three-dimensional micro pillar structure may include the pillar which is attached to the body at a certain angle and is formed integrally with the body, the conductive material which is applied to surround the pillar, and the insulating material coated to surround the conductive material in order to be insulated from the opposite surface. The voltage supplied through the wire is supplied to the conductive material. The passage for providing the wire is formed under of the plurality of three-dimensional micro pillar structures of the body.

According to various embodiments, the plurality of three-dimensional micro pillar structures may be arranged on the body in rows and columns, and the passage for providing the wire may be formed along the columns of the plurality of three-dimensional micro pillar structures.

According to various embodiments, the voltage supplied to the plurality of three-dimensional micro pillar structures may include the positive (+) voltage and the negative (−) voltage. The positive (+) voltage and the negative (−) voltage may be alternately supplied to the plurality of three-dimensional micro pillar structures in accordance with column positions of the plurality of three-dimensional micro pillar structures attached to the body.

According to various embodiments, the controller may be further included, which controls the magnitudes of the positive (+) voltage and the negative (−) voltage. The magnitude of the adhesive force of the surface structure may be determined based on the magnitudes of the positive (+) voltage and the negative (−) voltage controlled by the controller.

According to various embodiments, the voltage supplied to the plurality of three-dimensional micro pillar structures further includes the alternating current (AC) voltage. The controller may perform the tactile sensing on the basis of the change in the capacitance between the plurality of three-dimensional micro pillar structures of adjacent columns by the AC voltage.

According to various embodiments, the angle formed by the body with the plurality of three-dimensional micro pillar structures attached to the body may be any one of 15 to 75 degrees.

According to various embodiments, the body and the pillar integrally formed with the body may be formed of an elastomer.

According to various embodiments, the conductive material may be a silver nanowire.

According to various embodiments, the gripper device may include the hinge, the support connected to both sides with respect to the hinge, the spring controlling the bending of the support, and the above-described surface structure attached to the support.

According to various embodiments, a surface structure manufacturing method including: integrally manufacturing by stacking the body and the pillar which is a portion of the plurality of three-dimensional micro pillar structures formed at a certain angle with the body, such that the passage for providing wires is formed under the plurality of three-dimensional micro pillar structures of the body; connecting the wires through the passage; applying the conductive material to the pillar of the plurality of three-dimensional micro pillar structures; and coating the insulating material on the conductive material.

According to various embodiments, the manufacturing may include forming the plurality of three-dimensional micro pillar structures on the body in rows and columns, and forming the passage along the columns of the plurality of three-dimensional micro pillar structures.

According to various embodiments, the surface structure manufacturing method may further include connecting the first power supply for supplying a positive (+) voltage to first wires of the wires and the second power supply for supplying a negative (−) voltage to second wires of the wires such that the positive (+) voltage and the negative (−) voltage are alternately supplied to the plurality of three-dimensional micro pillar structures in accordance with column positions of the plurality of three-dimensional micro pillar structures formed on the body.

According to various embodiments, the surface structure manufacturing method may further include connecting a third power supply for supplying an alternating current (AC) voltage to the wire in order to perform the tactile sensing.

According to various embodiments, the manufacturing may include manufacturing the pillar which is a portion of the plurality of three-dimensional micro pillar structures such that the pillar forms an angle of any one of 15 to 75 degrees with the body.

According to various embodiments, the manufacturing may include manufacturing the body and the pillar by stacking a photocurable elastomeric resin through use of a photocurable three-dimensional printer equipment.

The micro adhesive surface structure proposed by the present disclosure is based on an innovation technology capable of not only reversible adhesive force manipulation by fusing a principle of electronic adhesion and a principle of mechanical adhesion but also tactile sensing that recognizes a local position, magnitude, and direction of a force applied to the surface of an object when contacting with and gripping the object.

The present disclosure relates to a simple three-dimensional micro adhesive surface structure composed only of micro pillar structures and is able to implement main functions of a multi-scale integrated electromechanical adhesive surface using carbon nanotubes and investigate the principles thereof in the future.

According to the embodiments of the present disclosure, on the basis of a process in which a three-dimensional electrode pattern is fabricated by finely processing and plastically deforming a thin metal thin plate of 0.02 mm or less and two electrode patterns are assembled on a flexible substrate and then an insulator thin film is uniformly deposited on the surface, it is possible to design and manufacture the three-dimensional micro adhesive surface for the implementation of the electromechanical adhesive technology.

The manipulation of the adhesive force of the present disclosure can be achieved by structural deformation of the surface where charge amounts of different poles are accumulated, wherein the structural deformation occurs when the structures of the three-dimensional micro adhesive surface come in contact with the object.

The embodiment of the present disclosure includes the tactile sensing function that senses a contact position, a contact direction, and the like by measuring a change in the amount of charge when the micro pillar structures of the proposed three-dimensional micro adhesive surface come into contact with the object in various forms. When physically contacting the surface in a vertical or horizontal direction after a constant voltage is maintained to the two three-dimensional electrode patterns, the change in the amount of charge is measured, so that the tactile sensing is performed and the sensitivity according to the shape, size, and arrangement of the surface structure is evaluated. In particular, a function to detect stop and slip with respect to a horizontal adhesive force.

The adhesive force of the micro structures of the three-dimensional micro adhesive surface proposed by the present disclosure can be measured and the object gripping by the surface micro structure can be performed. The adhesive force is measured in the vertical and horizontal directions, and the directionality according to the shape of the effervescent micro structure may be considered when the adhesive force in the horizontal direction is measured. Also, in order to confirm the performance of the surface micro structure proposed by the present disclosure, the adhesive force may be measured while controlling by an external voltage between 0 kV and 1 kV applied between the three-dimensional micro structures. Also, the magnitude and direction of the required force is determined by first contacting an object having various shapes and sizes by using the tactile sensing function. Then, a pick-and-placing function to freely lift and put down the object can be finally implemented.

What is claimed is:

1. A surface structure comprising:
   a body;
   a plurality of three-dimensional micro pillar structures which are attached to the body at a certain angle; and
   a wire which supplies a voltage to the plurality of three-dimensional micro pillar structures,
   wherein each of the plurality of three-dimensional micro pillar structures comprises:
      a pillar which is attached to the body at a certain angle and is formed integrally with the body;
      a conductive material which is applied to surround the pillar; and
      an insulating material coated to surround the conductive material in order to be insulated from an opposite surface,
   wherein the voltage supplied through the wire is supplied to the conductive material, wherein a passage for providing the wire is formed under the plurality of three-dimensional micro pillar structures of the body, wherein the plurality of three-dimensional micro pillar structures are arranged on the body in rows and columns, wherein the passage for providing the wire is formed along the columns of the plurality of three-dimensional micro pillar structures, wherein the voltage supplied to the plurality of three-dimensional micro pillar structures comprises a positive (+) voltage and a negative (−) voltage, and wherein the positive (+) voltage and the negative (−) voltage are alternately supplied to the plurality of three-dimensional micro pillar structures in accordance with column positions of the plurality of three-dimensional micro pillar structures attached to the body.

2. The surface structure of claim 1, further comprising
a controller which controls magnitudes of the positive (+) voltage and the negative (−) voltage, wherein a magnitude of the adhesive force of the surface structure is determined based on the magnitudes of the positive (+) voltage and the negative (−) voltage controlled by the controller.

3. The surface structure of claim 2,
wherein the voltage supplied to the plurality of three-dimensional micro pillar structures further comprises an alternating current (AC) voltage, and wherein the controller performs tactile sensing based on a change in a capacitance between the plurality of three-dimensional micro pillar structures of adjacent columns by the AC voltage.

4. The surface structure of claim 1, wherein the certain angle formed by the body with the plurality of three-dimensional micro pillar structures attached to the body is any one of 15 to 75 degrees.

5. The surface structure of claim 1, wherein the body and the pillar integrally formed with the body are formed of an elastomer.

6. The surface structure of claim 1, wherein the conductive material is a silver nano wire.

7. A gripper device comprising:
a hinge;
a support which is connected to both sides with respect to the hinge;
a spring which controls bending of the support; and
a surface structure which is attached to the support and is based on any one of claim 1 and claims 2 to 6.

8. A surface structure manufacturing method comprising:
integrally manufacturing by stacking a body and a pillar which is a portion of a plurality of three-dimensional micro pillar structures formed at a certain angle with the body, such that a passage for providing wires is formed under the plurality of three-dimensional micro structure of the body, the manufacturing comprising
forming the plurality of three-dimensional micro pillar structures on the body in rows and columns, and
forming the passage along the columns of the plurality of three-dimensional micro pillar structures;
connecting the wires through the passage;
applying a conductive material to the pillar of the plurality of three-dimensional micro pillar structures;
coating an insulating material on the conductive material; and
connecting a first power supply for supplying a positive (+) voltage to first wires among the wires and a second power supply for supplying a negative (−) voltage to second wires among the wires such that the positive (+) voltage and the negative (−) voltage are alternately supplied to the plurality of three-dimensional micro pillar structures in accordance with column positions of the plurality of three-dimensional micro pillar structures formed on the body.

9. The surface structure manufacturing method of claim 8, further comprising
connecting a third power supply for supplying an alternating current (AC) voltage to the wires in order to perform tactile sensing.

10. The surface structure manufacturing method of claim 8, wherein the manufacturing further comprises
manufacturing the pillar which is a portion of the plurality of three-dimensional micro pillar structures such that the pillar forms an angle of any one of 15 to 75 degrees with the body.

11. The surface structure manufacturing method of claim 8, wherein the manufacturing further comprises
manufacturing the body and the pillar by stacking a photocurable elastomeric resin through use of a photocurable three-dimensional printer.

12. The surface structure manufacturing method of claim 8, wherein the conductive material is a silver nano wire.

* * * * *